(12) United States Patent
Skogward

(10) Patent No.: US 9,441,729 B2
(45) Date of Patent: Sep. 13, 2016

(54) GEAR CHANGE ACTUATOR

(75) Inventor: Kenneth Skogward, Huskvarna (SE)

(73) Assignee: KONGSBERG AUTOMOTIVE AB, Mullsjö (SE)

( * ) Notice: Subject to any disclaimer, the term of this patent is extended or adjusted under 35 U.S.C. 154(b) by 279 days.

(21) Appl. No.: 13/981,560

(22) PCT Filed: Jan. 24, 2011

(86) PCT No.: PCT/IB2011/000115
§ 371 (c)(1),
(2), (4) Date: Jul. 24, 2013

(87) PCT Pub. No.: WO2012/101462
PCT Pub. Date: Aug. 2, 2012

(65) Prior Publication Data
US 2013/0305855 A1 Nov. 21, 2013

(51) Int. Cl.
*F16H 25/00* (2006.01)
*F16H 37/16* (2006.01)
(Continued)

(52) U.S. Cl.
CPC ............ *F16H 59/042* (2013.01); *F16H 19/08* (2013.01); *F16H 61/28* (2013.01); *F16H 61/32* (2013.01);
(Continued)

(58) Field of Classification Search
CPC ............ F16H 19/02; F16H 2019/085; F16H 59/042; F16H 61/32; F16H 2061/242; F16H 2061/2869; F16H 63/20; F16H 63/30; F16H 63/3016; F16H 2063/3066
USPC ........ 74/22 A, 23, 25, 89.14, 424, 425, 661, 74/665 A, 665 F
See application file for complete search history.

(56) References Cited

U.S. PATENT DOCUMENTS 3,853,414 A 12/1974 Hirano et al.
3,926,061 A * 12/1975 Paulson ................. B23Q 1/621
400/144.2

(Continued)

FOREIGN PATENT DOCUMENTS

DE 3605015 A1 9/1986
DE 19535065 A1 3/1997

(Continued)

OTHER PUBLICATIONS

English Translation of JP 2008094196 A.*

(Continued)

*Primary Examiner* — Ha D Ho
(74) *Attorney, Agent, or Firm* — Howard & Howard Attorneys PLLC

(57) ABSTRACT

A gear change actuator (40) including first and second rotary members (54) each rotatable in opposite first and second directions, the rotary members (54) engaged with a select unit (60), which is engaged with an output member (162) having an output axis. The select unit (60) has opposite first and second input motions, and opposite third and fourth input motions, induced by simultaneous rotation of the first and second rotary members (54. The select unit (60) has opposite first and second output movements that are transmutations of the select unit (60) first and second input motions, respectively. The select unit (60) also has opposite third and fourth output movements that are transmutations of the select unit third and fourth input motions, respectively. The output member (162) has movements, respectively imparted by the select unit (60) output movements, that are one of rotationally about the output axis and axially along the output axis.

19 Claims, 26 Drawing Sheets

(51) Int. Cl.
*F16H 29/20* (2006.01)
*F16H 59/04* (2006.01)
*F16H 61/32* (2006.01)
*F16H 19/08* (2006.01)
*F16H 25/20* (2006.01)
*F16H 61/28* (2006.01)

(52) U.S. Cl.
CPC ............... *F16H 2025/2046* (2013.01); *F16H 2061/2869* (2013.01); *F16H 2061/2892* (2013.01); *Y10T 74/18792* (2015.01)

(56) References Cited

U.S. PATENT DOCUMENTS

| | | | | |
|---|---|---|---|---|
| 4,449,416 | A | * | 5/1984 | Huitema ............... F16H 63/304 192/103 R |
| 4,954,006 | A | | 9/1990 | Suzuki et al. |
| 4,962,676 | A | * | 10/1990 | Vainstock ............... B23Q 1/25 409/201 |
| 5,265,495 | A | | 11/1993 | Bung et al. |
| 5,392,666 | A | * | 2/1995 | Lin ........................ F16H 55/24 74/402 |
| 5,480,198 | A | * | 1/1996 | Wydler ............... E05B 47/0012 292/142 |
| 5,876,149 | A | | 3/1999 | Dorr et al. |
| 6,003,395 | A | * | 12/1999 | Rogg ..................... F16H 59/70 324/207.2 |
| 6,070,480 | A | * | 6/2000 | Kerschner ............. B23Q 1/621 74/89.2 |
| 6,321,612 | B1 | * | 11/2001 | Leimbach ............... F16H 61/32 74/335 |
| 7,044,018 | B2 | | 5/2006 | Sanchez et al. |
| 7,396,183 | B2 | | 7/2008 | Dona Contero et al. |
| 7,520,691 | B2 | | 4/2009 | Dearing et al. |
| 2005/0103145 | A1 | | 5/2005 | Pollak et al. |
| 2006/0005654 | A1 | | 1/2006 | Ehrlich et al. |
| 2006/0060026 | A1 | * | 3/2006 | Hawkes .................. F16H 55/24 74/661 |
| 2008/0015084 | A1 | * | 1/2008 | Mayumi ................. F16H 25/20 476/67 |
| 2011/0013974 | A1 | | 1/2011 | Orsolini |
| 2012/0170969 | A1 | | 7/2012 | Forthaus et al. |
| 2012/0189377 | A1 | | 7/2012 | Orsolini |

FOREIGN PATENT DOCUMENTS

| | | |
|---|---|---|
| DE | 19756266 A1 | 6/1999 |
| DE | 4428496 C2 | 8/1999 |
| DE | 19941474 A1 | 3/2001 |
| DE | 10320940 A1 | 11/2004 |
| DE | 10350938 A1 | 5/2005 |
| DE | 102004037711 A1 | 7/2005 |
| DE | 19824530 B4 | 4/2009 |
| EP | 0397631 A2 | 11/1990 |
| EP | 0403107 A1 | 12/1990 |
| EP | 0488857 A1 | 6/1992 |
| EP | 1499820 A1 | 1/2005 |
| EP | 1614911 A2 | 11/2006 |
| JP | 60245871 A | 12/1985 |
| JP | 2008094196 A | * 4/2008 |

OTHER PUBLICATIONS

Dorman 14043 Help! Shift Cable Bushing for Saturn SL and SC Series Ball Joint Apparatus.
International Search Report PCT/IB2011/000115, Jul. 11, 2011; 7 pages.
English language abstract of JP 60-245871(Al) extracted from http://www19.ipdl.inpit.go.jp/PA1/result/detail/main/wx5IgiaDA360245871P1.htmon; Nov. 22, 2013. 1 pages.
English language abstract of DE 10320940 (A1) extracted from www.espacenet.com on Nov. 20, 2013. 32 pages.
English language abstract of DE 10350938 (A1) extracted from www.espacenet.com on Nov. 20, 2013. 11 pages.
English language abstract of DE 19535065 (A1) extracted from www.espacenet.com on Nov. 20, 2013. 10 pages.
English language abstract of DE 4428496 (A1) extracted from www.espacenet.com on Nov. 20, 2013. 22 pages.
English language abstract of DE 3605015 (A1) extracted from www.espacenet.com on Nov. 20, 2013. 16 pages.
English language abstract of DE19756266 (A1) extracted from www.espacenet.com on Nov. 20, 2013. 19 pages.
English language abstract of DE19824530 (A1) extracted from www.espacenet.com on Nov. 20, 2013. 22 pages.
English language abstract of DE19941474 (A1) extracted from www.espacenet.com on Nov. 20, 2013. 18 pages
English language abstract of DE102004037711 (A1) extracted from www.espacenet.com on Nov. 20, 2013 48 pages.
English language abstract of EP0488857 (A1) extracted from www.espacenet.com on Nov. 20, 2013. 19 pages.
English language abstract of EP1499820 (A1) extracted from www.espacenet.com on Nov. 20, 2013. 10 pages.

* cited by examiner

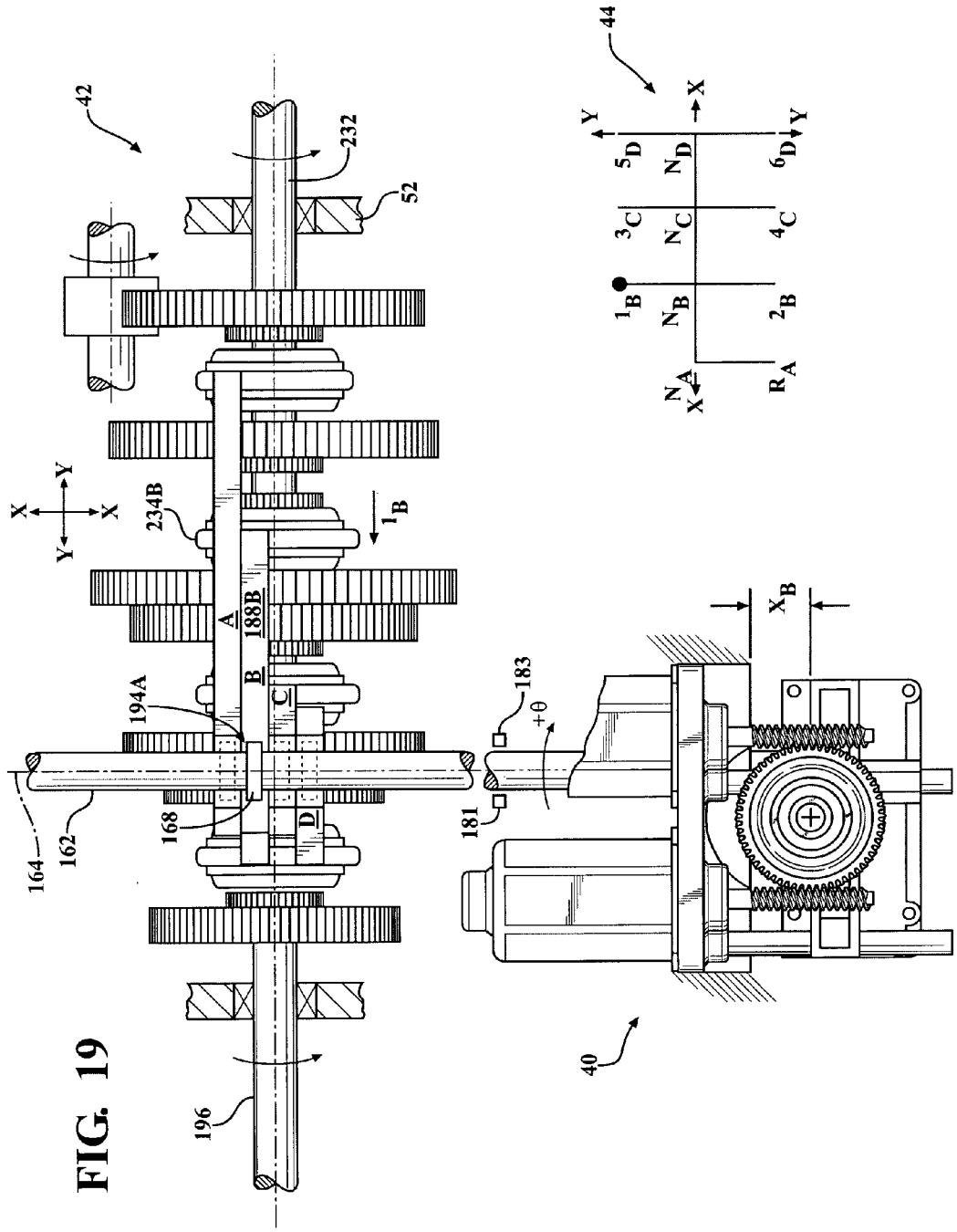

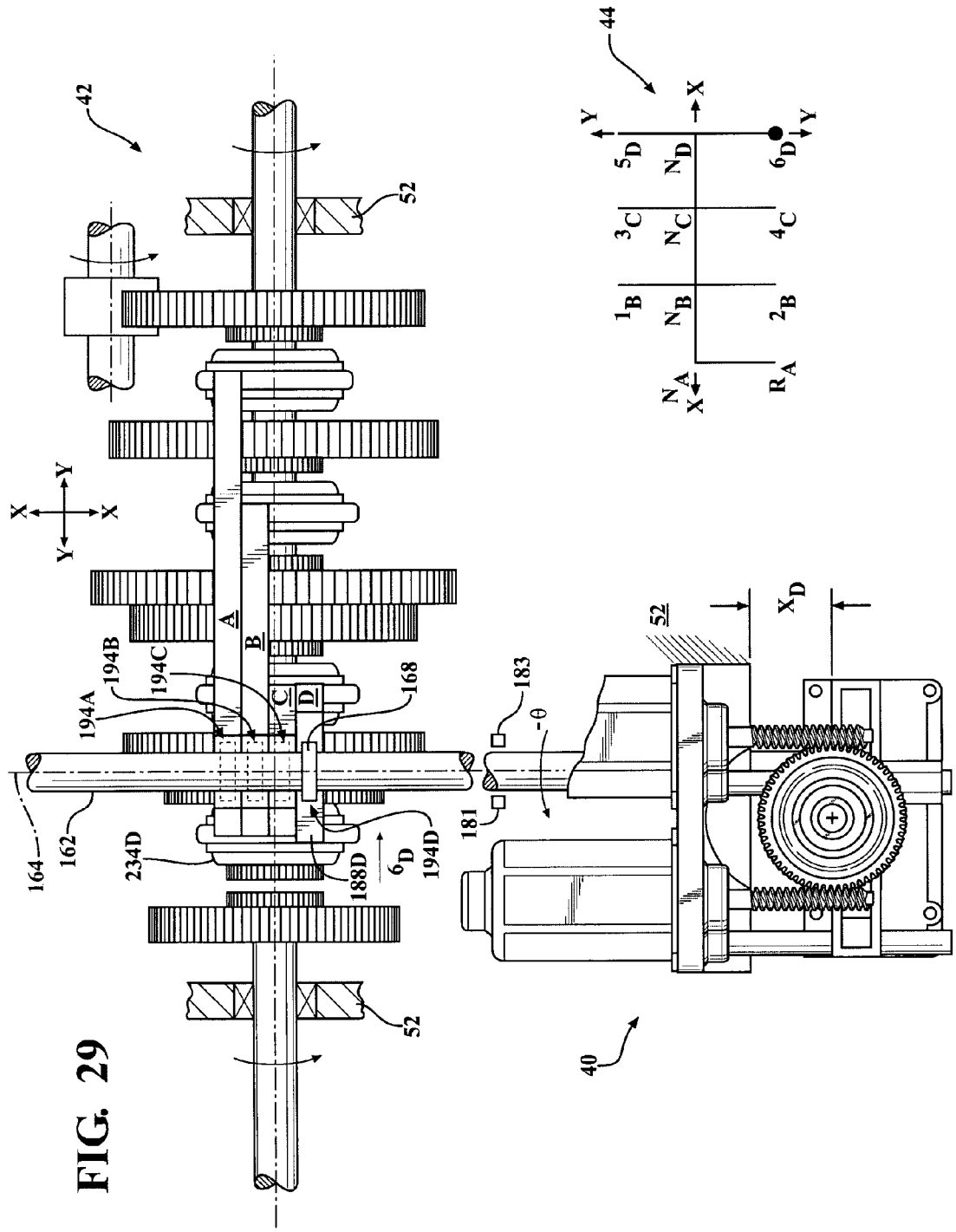

GEAR CHANGE ACTUATOR

RELATED APPLICATIONS

This application is the National Stage of International Patent Application No. PCT/IB2011/000115, filed on Jan. 24, 2011, the content of which is incorporated herein by reference.

TECHNICAL FIELD

The present invention relates to transmission gear change actuation mechanisms, particularly of the type used in "shift-by-wire" systems, in which gear changes are effected through actuation of one or more electric motors.

BACKGROUND OF THE INVENTION

Change-gear transmissions and so-called X-Y shifting devices therefor are well known in the prior art. Briefly, X-Y gear change actuators or shifters are devices which control the X-X (or selection directional) and the Y-Y (or engage/not-engaged directional) positions of a shift control member such as a shift finger or the like. Typically, in shift-by-wire systems adapted for use with change-gear transmissions, two separate electric motors are used to control the X-X and Y-Y positioning of the shift control member, and thus the selection of gears through which the transmission input and output shafts operably communicate. The transmission input and output shafts are in operable communication when in power transmitting engagement with each other. Typically, the transmission input shaft is selectively engaged, for example through a master friction clutch C, to the output shaft of a prime mover such as a gasoline or diesel engine E (FIG. 30).

Referring to FIG. 30, in manual change-gear transmission types, when the master friction clutch C is engaged, the input shaft of the transmission T rotates with and in the same direction as the engine output shaft. The transmission may include one or more countershafts operably disposed between the transmission input and output shafts, which are selectively engaged at different gear ratios through the respectively selected gears.

Typically X-Y shifter S is mounted to the transmission T and manually controlled as a slave device electrically connected to the operator's shift lever interface L or an intermediate controller module M, or is under the control of a system controller of a fully or partially automated transmission system. Typically, in manual transmission applications, the shift lever L is manipulated through an X-Y or H-pattern that simulates the corresponding X-Y positioning of the shift control member within the transmission.

As is known, the purpose of an X-Y shifter S is to properly position the shift control member by moving it along paths on which different sets of gears that that may be engaged and disengaged, and on which the gears of the selected set are brought into and out of power transmitting engagement with the transmission input and output shafts. In a manual change-gear transmission T, for example, the shift finger may be positioned along the X-direction between different "gates" in which a respective set of gears is engageable and disengageable, and along the Y-direction between the neutral gear and gear engagement positions in the selected gate.

The progressive selection of forward gears in manual change-gear transmissions T is typically through at least portions of at least one H-shaped shift pattern. For example in a one-reverse-speed, six-forward-speed manual transmission (i.e., a six-speed manual transmission), progression from first through sixth gear usually involves the operator's corresponding movement of the shift lever L through an interface 44 including a pair of H-shaped patterns (FIG. 30) that share a common central longitudinal leg extending along the Y-direction. The lateral crossbars of each H pattern extend along the X-direction, and are aligned and connected across the shared central longitudinal leg. In such a six-speed transmission, the reverse shift lever position is typically laterally outward of the forward gear H patterns, along the direction of the aligned cross-bars in the X-direction, and also longitudinally along a short Y-direction leg. Thus, a six speed manual transmission T, for example, typically includes four longitudinal legs or gates, each defined by a respective leg of shift finger travel in the Y-direction, with the legs spaced from each other along the X-direction.

Relative to the shift lever's (L) usual orientation as installed in a vehicle, in the exemplary six-speed manual transmission T, the six forward speed shift lever gear positions have a forwardmost position in which gears 1, 3, and 5 are located, and a rearwardmost position in which gears 2, 4, and 6 are located, the forwardmost and rearwardmost positions located on opposite sides of the central, neutral gear positions. The four gates may be respectively identified A-D, and in the example pattern of shift lever interface 44 herein discussed the reverse gear lever position $R_A$ is located to the left, along gate A, and adjacent to the second gear position $2_B$. The movement of the shift control member in the transmission may directly correspond to movement of the shift lever L in X-Y directions. That is, the shift lever and shift control member may be correspondingly moved through similar shift patterns substantially simultaneously to engage a particular ratio and/or drive direction.

By way of example, referring to FIG. 30, assuming a six-speed manual transmission is engaged in first gear (position $1_B$) and a shift to second gear (position 20 is required (i.e., a "1-2" shift), the shift lever and shift control member are each correspondingly moved in its respective Y-Y direction along gate B from the $1_B$-$3_C$-$5_D$ position to neutral gear position $N_B$ to disengage first gear, then continued along gate B to the $R_A$-$2_B$-$4_C$-$6_D$ position to engage second gear. If a further shift to third gear (position $3_C$) is required (i.e., a "2-3" shift), the shift lever and shift control member are each correspondingly moved in the respective Y-Y direction along gate B from the $R_A$-$2_B$-$4_C$-$6_D$ position to neutral gear position $N_B$ to disengage second gear, then moved to neutral gear position $N_C$ of gate C, and then continued along gate C to the $1_B$-$3_C$-$5_D$ position to engage third gear.

In prior shift-by-wire systems, a typical X-Y gear change actuator S includes a first motor for moving the shift control member or shift finger in the X-X direction and a second motor for moving the shift control member in the Y-Y direction. The first and second motors may be electric motors and/or fluid motors controlled by solenoids or the like. The X-Y position of the shift control member may be indicated by sensors that communicate with an electronic control unit ("ECU") in controller module M, which controls a motor driver and a switching device for individually connecting the motor driver, to the first and second motors one at a time. The ECU is preferably microprocessor-based, and receives and processes input signals according to logic rules to issue command output signals as described, for example, in U.S. Pat. Nos. 4,361,060 and 4,595,986, the disclosures of which are expressly incorporated herein by reference. Through this control arrangement, the first and second motors of the prior gear change actuator S are each respectively dedicated to positioning the shift control member in the X and Y directions, and are individually controlled only one at a time, rather than simultaneously. Moreover, to effect quick, effective positioning of the shift control member between various positions along its X and Y directions, one of the first and second motors is typically larger than the other, for the motors are matched to the requirements of moving the shift control member in its X or Y direction in view of physical characteristics associated with shifting between gates (X-direction movement), and the positions along each gate (Y-direction movement).

For example, within a prior manual gear-change transmission T, each gate may be respectively provided with a gear change mechanism through which gear changes in that gate are accomplished through movement of a shift rail and fork assembly that is coupled to a control collar or ring. Typically, each shift rail extends along a shift rail axis. As is well known, movement of the shift rail along its axis in the Y-direction effects movement of its fork, and the control collar it is coupled to, therealong. The fork is typically defined by a pair of fingers that are joined at a hub section and define therebetween a U-shaped opening in which the control collar is received and relative to which it is axially fixed. The fork fingers extend about the circumference of its respective control collar and are disposed in a circumferential collar groove, the distal ends of the fingers disposed in the groove interfacing the opposing axial sides that define the collar groove. Each control collar is concentric with and rotatably fixed about the transmission mainshaft or output shaft and is rotatable relative to its fork, which positions the collar axially along the mainshaft or output shaft axis.

The respective control collar of each gate slides between a neutral gear position in which it is rotatably fixed to the transmission mainshaft or output shaft but is not operably engaged with the input shaft, and at least one gear engagement position. In each gear engagement position, the control collar remains rotatably fixed to the transmission mainshaft and is also operably engaged with the transmission input shaft, typically by being coupled to a gear of a gear train that is driven by the input shaft. The geartrain ordinarily provides gear reduction and rotation direction changes between the transmission input and output shafts. Thus, each control collar serves as a dog clutch for its respective gear change mechanism, through which the input and output shafts are selectively rotatably interconnected.

In this example, the movements of each shift rail and fork assembly is imparted by corresponding shift control member movements between shift positions in the respective gate, which is driven by the actuator motor solely dedicated to Y-direction motion of the gear change mechanism. Shift finger movement in the X-direction between different gates, which occurs only when the gear change mechanisms of all gates are each in their respective neutral gear position, is driven by the motor solely dedicated to X-direction motion of the gear change mechanism.

Relative to the selected gate, the shift finger engages the shift rail of its gear change mechanism, for example by its finger tip being received between interfacing sidewalls of a slot formed in the shift rail. The shift finger may extend radially from, and be fixed to, a rotatable and axially moveable cylindrical shift rod. The tip of the shift finger bears against the opposite sidewalls of the shift rail slot, and angular movement of the shift rod about its axis moves the shift finger tip in Y-direction, correspondingly forcing the shift rail to be moved axially along the Y-direction, which effects corresponding movement of the shift fork and the control collar engaged thereby. Axial movement of the control collar effects gear engagement or disengagement in that gate, as described above. Because the shift rod is also axially displaceable in the X-direction along its axis, the shift finger may be moved between aligned, adjacent slots of the various shift rails, which are generally arranged to move axially in parallel relative to one another. The slots of all shift rails are aligned along the X-direction, and each may receive the shift finger tip, only when the shift rails and control collars are all in their respective neutral gear positions.

The six-speed manual gear-change transmission T as described above is further described below, and is an example of one transmission type to which a gear change actuator according to the present invention may be adapted for use.

A problem with prior shift-by-wire gear change actuators S used with such transmissions T is that they require two motors, each individually coupled to the shift rod for respectively performing shift control member movements in X and Y directions. Moreover, these two motors may differ from one another, which complicates the design and assembly of the gear change actuator, and carries attendant costs. Moreover, performing each of the shifting and selecting functions with a single, respectively dedicated motor may require at least one of the two motors to be undesirably large and high in inertia, and compromise the dynamic performance of the shifter actuator and the transmission gear change mechanism.

Thus, there is a need for an improved shift-by-wire gear change actuator that simplifies the design and assembly, and accommodates the use of identical and relatively smaller and less expensive motors, which may also be of relatively lower inertia.

SUMMARY OF THE INVENTION

The invention addresses above-identified problems of prior shift-by-wire gear change actuators by providing a gear change actuator of simplified design and assembly, and accommodates identical motors. The motors operate in concert, i.e., they simultaneously rotate, each in one direction or the other, and share the load associated with moving the shift control between gear engagement and disengagement (neutral) positions within each gate, and between the different gates themselves. Thus, the work performed by one motor in a prior shifter, is performed by two motors which may each be smaller than the prior, dedicated single motor. Moreover, the two motors may be identical to minimize complexity and reduce costs vis-à-vis the prior art scenario of two dedicated motors in which only one of the two motors operates at a time to respectively move the transmission shift device in X and Y directions.

The present invention provides a gear change actuator for use with a change-gear transmission, in which the actuator includes an output member having an output axis and adapted for changing between different gear shifter positions in a transmission through movement of the output member relative to the output axis. The actuator further includes a select unit engaging the output member, the select unit having opposite first and second output movements and opposite third and fourth output movements. A respective one of a plurality of different movements of the output member relative to the output axis is imparted by the select unit during a respective one of the select unit first, second, third and fourth output movements. The actuator further includes first and second motors each having a drive axis and a rotary member capable of rotation in respective opposite first and second directions about its respective motor drive axis, the rotary members each operably engaged with the select unit and having simultaneous rotation during operation of the actuator. The select unit has opposite first and second input motions. The select unit first input motion is induced by simultaneous rotation of the first and second motor's rotary members each in one of its respective first and second directions. The select unit second input motion is induced by simultaneous rotation of the first and second motor's rotary members each in the other of its respective first and second directions. The select unit first and second output movements are transmutations of the select unit first and second input motions, respectively. The select unit also has opposite third and fourth input motions. The select unit third input motion is induced by simultaneous rotation of the first motor's rotary member in said other of its respective first and second directions and of the second motor's rotary member in said one of its respective first and second directions, and the select unit fourth input motion is induced by simultaneous rotation of the first motor's rotary member in said one of its respective first or second direction and of the second rotary member in said other of its respective first and second directions. The select unit third and fourth output movements are transmutations of the select unit third and fourth input motions, respectively. Output member movements respectively imparted by the select unit first and second output movements are one of rotationally about the output axis and axially along the output axis, and output member movements respectively imparted by the select unit third and fourth output movements are the other of rotationally about the output axis and axially along the output axis. Said select unit comprises an input member having a central axis, said input member being disposed between said first and second rotary members and operably engaged therewith. Said select unit first and second input motions each comprise a rotation of said select unit input member about said central axis. The gear shift actuator is characterized in that said select unit third and fourth input motions each comprise movement of said select unit input member in a lateral direction relative to said central axis.

Preferred embodiments of the invention are set out in the dependent claims.

BRIEF DESCRIPTION OF THE DRAWINGS

To accomplish the above and related objects, the invention may be embodied in the forms illustrated in the accompanying drawings, attention being called to the fact, however, that the drawings are illustrative only, and that changes may be made in the specific constructions illustrated. Moreover, it is to be noted that the accompanying drawings are not necessarily drawn to scale or to the same scale. In particular, the scale of some of the elements of the drawings may be exaggerated to emphasize characteristics of the elements.

Various other objects, features and attendant advantages of the present invention will become fully appreciated as the same becomes better understood when considered in conjunction with the accompanying drawings, in which like reference characters designate the same, similar or corresponding parts throughout the several views, and wherein:

FIG. 19 is a view of the transmission of FIG. 18 along line 19-19 and its shift lever interface in first gear positions $1_B$;

FIG. 29 is a view of the transmission of FIG. 28 along line 29-29 and its shift lever interface in sixth gear positions $6_D$;

Figure 1:
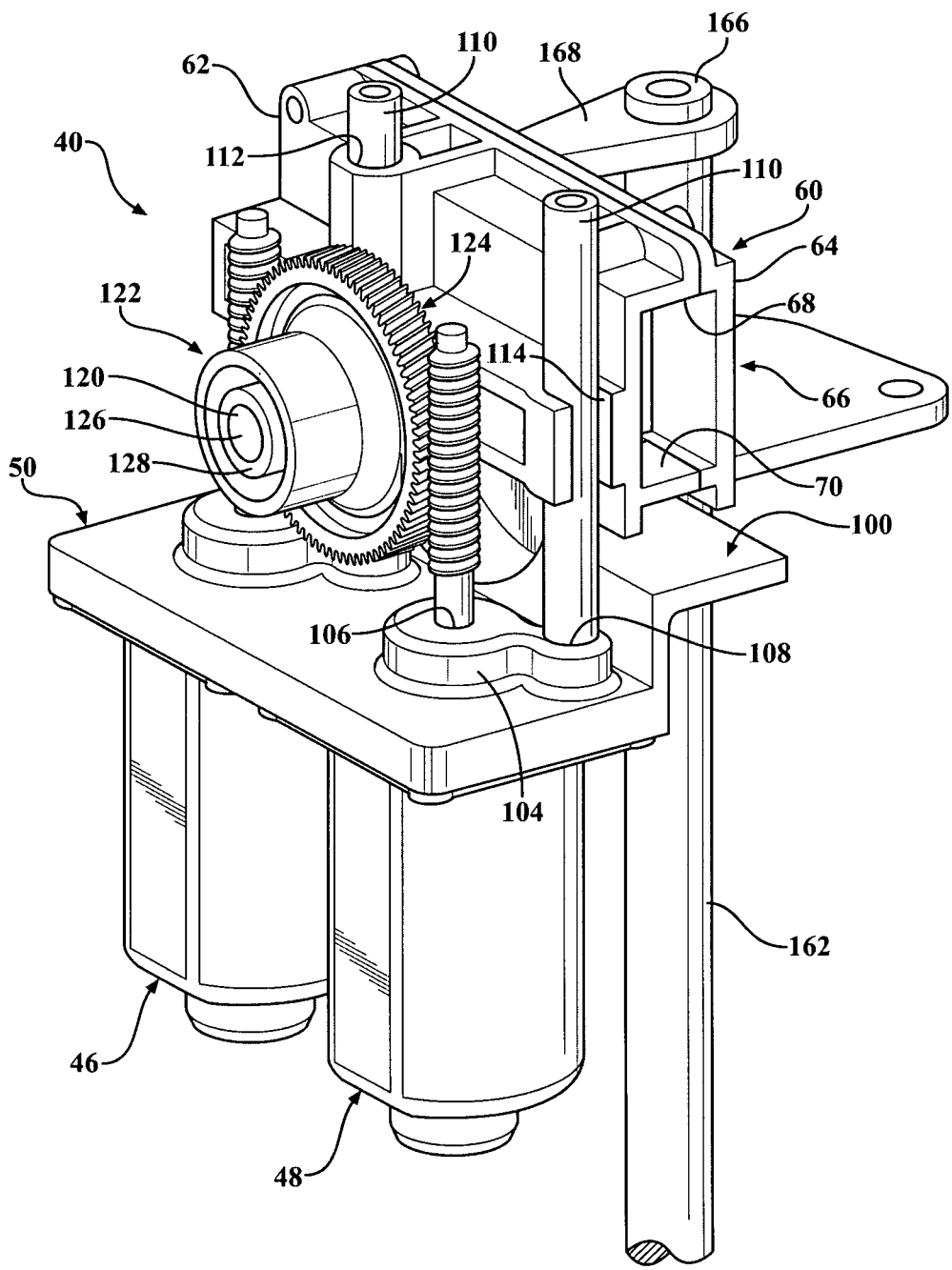
FIG. 1 is a perspective, view of a gear change actuator.

While the invention is susceptible to various modifications and alternative forms, a specific embodiment thereof is shown by way of example in the drawings and is herein described in detail. It should be understood, however, that the drawings and detailed description are not intended to limit the invention to the particular for disclosed, but on the contrary, the intention is to cover all modifications, equivalents and alternatives falling within scope of the present invention as defined by the appended claims.

DETAILED DESCRIPTION OF THE EXEMPLARY EMBODIMENT(S)

FIG. 1 shows gear change actuator or shifter 40 for shifting a change-gear transmission of a vehicle between a plurality of different gear positions. The different gears of transmission 42 include a reverse gear and a plurality of forward gears, with the forward gears typically arranged in pairs relative to each gate. In each gate, the different forward gear engagement positions are separated by an interposed neutral gear position. Actuator 40 is adapted for use with the six-speed manual transmission referred to above, further aspects of which are set out below and depicted in the accompanying drawings. Transmission 42 is a non-limiting example of a change-gear transmission including actuator 40.

Figure 30:
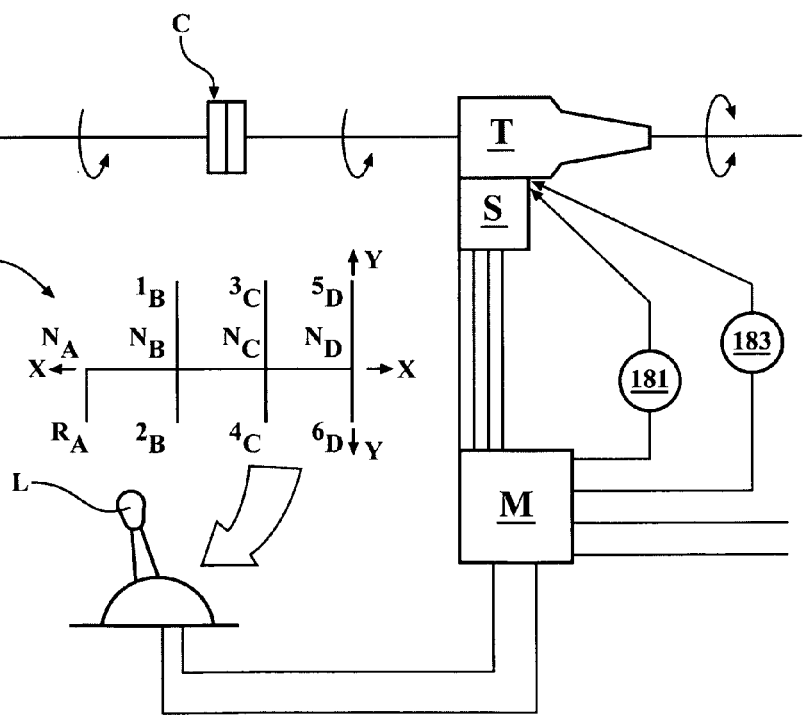
FIG. 30 is a schematic view of a vehicle powertrain including a transmission T having a shift lever interface L and controller M comprising parts of a shift-by-wire system, that may include prior shift-by-wire gear change actuator S, or to which the gear change actuator of FIG. 1 may be adapted.

Actuator 40 performs two distinct functions: a selection function and a shifting function. The selection function moves the transmission's shift control member in the X-direction between each of the gates with the transmission in neutral gear positions. Within actuator 40 is a shifting mechanism through manipulation of which the shifting function is performed. During the shifting function, actuator 40 moves the shift control member of a gear change mechanism in the Y-direction between the gear engagement and neutral gear positions within each of the gates. Transmission 42 includes four gates A-D among which are located six forward gear positions and a reverse gear position; there is one neutral gear position in each gate. The operator manipulates a shift lever through an interface 44 defining a pattern of corresponding shift lever positions. The shift lever interface 44 is electrically connected to the actuator 40 through a shift-by-wire control system, which may include controller module M (FIG. 30).

The actuator 40 includes a pair of first and second electric motors 46, 48 disposed adjacent to each other on a bracket 50 to which they are fixed. The actuator bracket 50 may be steel and is fixed to the exterior of housing 52 of transmission 42, and the exteriorly exposed portions of actuator 40 may be partially or completely shrouded from the elements and protected from damage by a shroud (not shown). Motor shaft or rotary member 54 extends from each of the electric motors 46, 48, with each of the shafts 54 defining an axis of rotation 56. First and second motor shafts 54 are each steel and are substantially parallel to one another, and each includes threaded portion 58 along a predetermined length thereof. The electric motors 46, 48 are each respectively capable of reversibly rotating its shaft 54 about its axis 56. In other words, each of motors 46, 48 can selectively rotate its shaft 54 in a clockwise or counter-clockwise direction (e.g., $\pm\Phi$) about its motor axis 56. Motors 46, 48 may be servomotors or stepping motors. The electric motors 46 and 48 work in concert with each other (i.e., they simultaneously rotate in either of their respective, opposite, first and second directions $\pm\Phi$), rather than solely operate independently, to perform both the selection and shifting functions of gear change actuator 40. Thus, the combined driving forces of the two motors working together are used in performing both functions. Motors 46 and 48 are preferably identical in all respects, and as shown include right-hand threads. Those of ordinary skill in the art will appreciate that the directions of motor rotation $\pm\Phi$ and the orientation of teeth on the gear wheel (described below) may be changed to alternatively utilize left-hand threads in portions 58.

The actuator 40 further includes a select unit 60 that is moveable in directions parallel to motor shaft axes 56. The select unit 60 includes select link 62 and a link guide 64 fixed to the select link 62 to define carrier 66. Select link 62 and link guide 64 may be molded of a suitable nylon material. The select link 62 is provided with parallel, interfacing top and bottom walls 68, 70 that extend perpendicularly from its planar front guide surface 72; and the link guide 64 is provided with parallel, interfacing top and bottom walls 74, 76 that extend perpendicularly from its planar back guide surface 78. The top walls 68, 74 are adjacent and flush with each other to form a planar top guide surface 80; the bottom walls 70, 76 are adjacent and flush with each other to form a planar bottom guide surface 82; and the pair of interfacing front and back guide surfaces 72, 78 and the pair of top and bottom guide surfaces 80, 82, are respectively parallel with each other. The guide surfaces 72, 78, 80, 82 define a parallelepipedic chamber 84 of carrier 66. The opposite lateral sides of chamber 84 may be open, as shown. A shift link 86 externally configured substantially as a parallelepiped block is disposed within the chamber 84, and slidably engages guide surfaces 72, 78, 80, 82. Shift link 86 may be sintered powdered metal. Within chamber 84, shift link 86 has movement in a direction that is substantially perpendicular to motor axes 56, and parallel with an imaginary plane containing motor axes 56.

A portion of select link bottom wall 70 is provided with a void 88 defining an opening 90 in bottom guide surface 82 that is aligned with the rectangular area 92 defined by edges 94, 96, 98 in planar surface 100 of actuator bracket 50. Area 92 partially defines a cylindrically scalloped void 102 in actuator bracket 50 that is aligned, in directions parallel with motor axes 56, with opening 90 in select link 62. An M-link member, described below, may rotate out of chamber 84, through openings 90, 92 and into void 102 during performance of the actuator's shifting function.

Bracket 50 is provided with a pair of bosses 104 having through bores 106 through which motor shafts 54 extend. Bosses 104 may contain bushings (not shown) that define through bores 106, and stabilize motor shafts 54. Adjacent to through bores 106, bosses 104 are provided with recesses 108 into which are press-fitted tubular standards 110 that extend in parallel with motor shafts 54 and are respectively slidably received within cylindrical guide bore 112 and semi-cylindrical guide recess 114 formed in select link 62.

Select link 62 is provided with an elongated bearing 116 defined by a through bore 118 that extends substantially perpendicularly to the axis of cylindrical guide bore 112. The bearing through bore 118 opens into chamber 84, and rotatably supports cylindrical steel stub shaft 120 that extends substantially beyond the overall length of through bore 118.

The select unit 60 includes a gear wheel 122, the outer periphery of which is formed with gear teeth 124 that are in meshed engagement with the threaded portions 58 of motor shafts 54, thereby forming a worm/worm gear configuration therewith. Gear wheel 122 may be molded of a suitable nylon material. The exterior end 126 of stub shaft 120 is fixed to the central hub 128 of gear wheel 122, as by a press-fitted or keyed interconnection. The interior end 130 of stub shaft 120 is similarly fixed to M-link 132 located at least partially within chamber 84. Gear wheel 122 and M-link 132 are thus directly rotatably fixed together. M-link 132 includes an elongate steel bar 134 of rectangular cross section, having a centrally located aperture 136 into which stub shaft interior end 130 is fixed. At each opposite end of bar 134 is affixed a steel post 138 extending in parallel with the stub shaft axis 140 towards link guide 64 and about which is rotatably supported a roller 142 on a bearing (not shown). Rollers 142 may be steel. Each post 138 extends along an axis 143 about which its respective roller 142 is rotatable. Between axis 140 and each axis 143, bar 134 defines a lever arm 145, the length of which includes lever radius R between axes 120 and 143 which may, for example, be 20 mm.

Shift link 86 is formed with a pair of U-shaped recesses 144 that each extend into the front side 146 of shift link 86, which slidably engages front guide surface 72 of select link 62. Recesses 144 extend from front side 146 into the thickness of shift link 86 to a depth that accommodates the material thickness of bar 134 and the projecting lengths of posts 138, and form planar back walls 148 that interface the terminal ends of posts 138 and axial faces of rollers 142. The mouths at the ends of U-shaped recesses 144 open to the bottom side 150 of shift link 86, which slidably engages planar bottom guide surface 82; the opposite closed ends of recesses 144 each define a curved end wall 152. The spacing between the respective, opposite left and right side walls 154, 156 of each U-shaped recess is substantially identical to the diameter of rollers 142. Located between adjacent, opposed right and left recess side walls 156, 154 of shift link 86, intermediate recesses 144, is middle portion 158. The thickness of the middle portion 158 along axis 140 near the shift link bottom side 150 is reduced to provide clearance for accommodating the M-link bar 134, such that the entire height of M-link 132 along the axis 140 of stub shaft 120 can be contained within the overall thickness of shift link 86 that extends between guide surfaces 72 and 78. The height of the U-shaped recess side walls 154, 156 along the clearanced middle portion 158, although reduced, is still preserved to an extent sufficient to accommodate the axial width of the engaging rollers 142, which roll along them.

Figure 9:
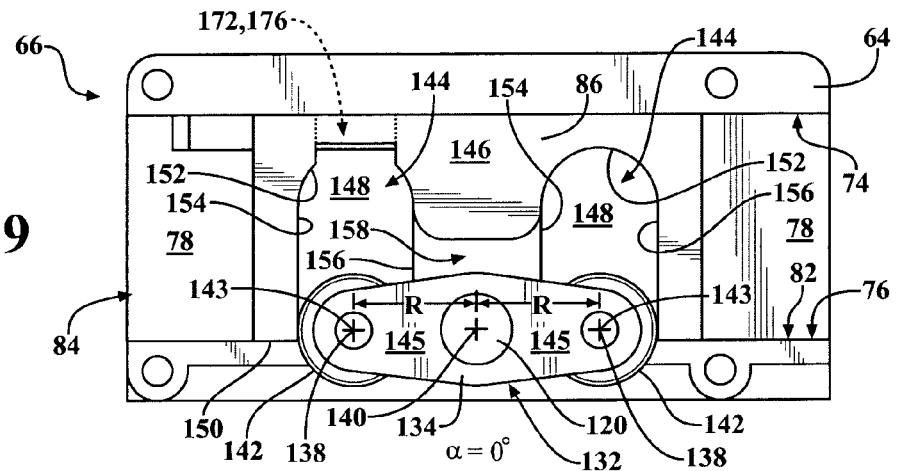
FIG. 9 is a front elevation of the M-link and shift link of the gear change actuator in a neutral gear position.
Figure 10:
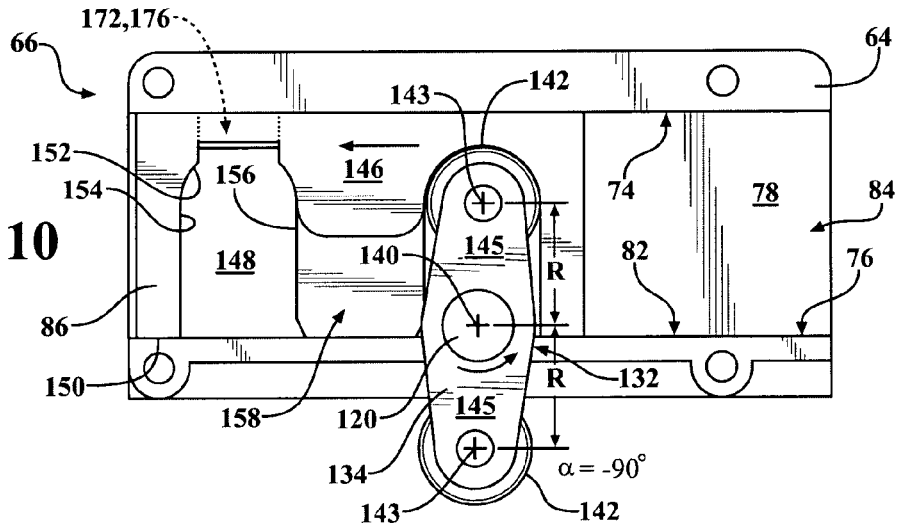
FIG. 10 is a front elevation of the M-link and shift link of FIG. 9, in a first gear engagement position (Y-direction)
Figure 11:
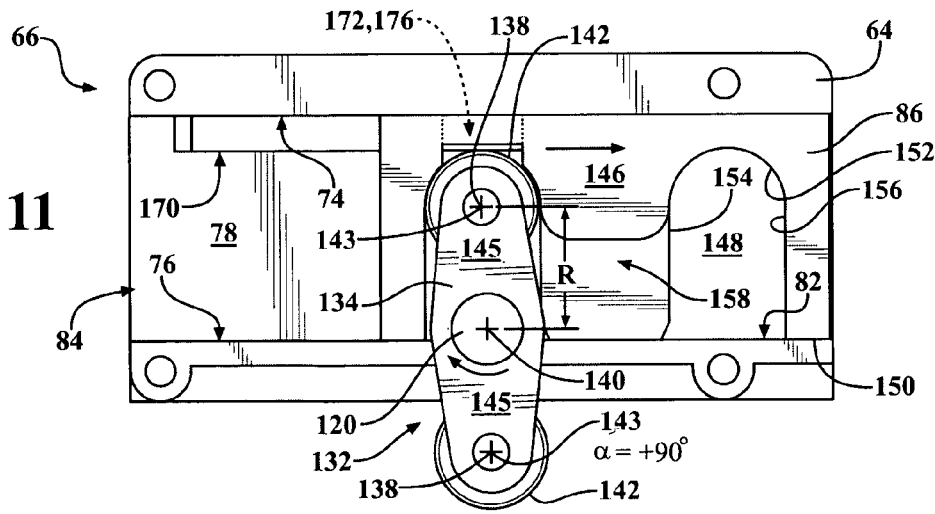
FIG. 11 is a plan view similar to FIG. 10, in a second gear engagement position (Y-direction)

With reference to FIGS. 9-11, it will be understood that rotation of stub shaft 120 and M-link 132 about axis 140, through a cumulative, total angle $\alpha$ of about 180°, imparts lateral movement of shift link 86, relative to axis 140, from one end of chamber 84 to the other, by rollers 142 bearing against the side walls 154, 156 of recesses 144, whereby rotation of stub shaft 120 about its axis 140 is transmuted into lateral motion of the shift link 86 relative to that axis. As described further below with reference to the exemplary transmission embodiment, an M-link angle $\alpha$ defined as 0°, at which the shift link 86 is substantially centered laterally relative to axis 140 (see FIG. 9), corresponds to a neutral gear position $N_A$, $N_B$, $N_C$, or $N_D$ within the respective gate A-D. Thus, the cumulative, approximately 180° angle $\alpha$ through which stub shaft 120 may rotate during shifting operations in gates B-D, is the total angle between about −90° and about +90°. Relative to the neutral gear position $N_A$, $N_B$, $N_C$, or $N_D$, movement of the M-link in the angle $\alpha$ range between about 0° and about −90°, which forces the shift link 86 leftward relative to axis 140 (as viewed in FIG. 10), corresponds to a shift control member 160 movement towards gear engagement position $1_B$, $3_C$, or $5_D$, within the respective gate B-D. Relative to the neutral gear position $N_A$, $N_B$, $N_C$, or $N_D$, movement of the M-link in the angle $\alpha$ range between about 0° and about +90°, which forces the shift link 86 rightward relative to axis 140 (as viewed in FIG. 11), corresponds to a shift control member 160 movement towards gear engagement position $R_A$, $2_B$, $4_C$, or $6_D$, within the respective gate A-D. In other words, the gear position along each gate is toggled between the neutral gear position and at least one gear engagement position along the Y-direction with a corresponding rotation of stub shaft 120 by an angle $\pm\alpha$, within the range of approximately $\pm 90°$. The induced rotation of gear wheel 122 in either angular direction is a select unit input motion.

Angular movement of lever arm 145 about axis 140 brings the circumferential surface of one of rollers 142 to bear on one of the side walls 154, 156 of its recess 144. Thus, the rotatable toggling of M-link 132 about axis 140 is transmuted into linear movement of shift link 86. The linear motion response of shift link 86 to the rotative input of stub shaft 120, and thus of motor shafts 54, is variable and nonlinear through the range of angle $\alpha$ positions experienced during the shifting function.

Roller 42 contacts its respective recess' side wall 154, 156 at a localized point or line of contact 161 (FIGS. 31-34) on the side wall, point 161 moving along that side wall with changes in angle $\alpha$. The force borne by roller 142 on shift link 86 at point 161 induces the linear movement of shift link 86, and is a component of the tangential force or movement of lever arm 145 at axis 143 resulting from the torque or rotation of shaft 120 about axis 140.

Side walls 154, 156 are substantially planar and perpendicular to the directions of shift link 86 movements within chamber 84. The force component inducing linear movement of shift link 86 is applied by roller 142 on side wall 154, 156 at point 161, which defines length V of virtual lever arm 163 (FIGS. 31-34), which extends perpendicularly to the direction of shift link travel. Length V is the distance along side wall 154, 156 from an imaginary plane parallel with the direction of linear shaft link travel, in which axis 140 lies. Virtual lever arm 163 length V therefore varies and has a minimal value when $\alpha=0°$, and a maximum value when $\alpha=\pm 90°$. The rate of lateral movement (relative to axis 140) of point 161 along the direction of travel of shift link 86 is variable and nonlinear relative to the rate of change in length V, and so, therefore, the rate of change in the linear movement of shift link 86 within chamber 84 is variable and nonlinear relative to the rate of rotation of stub shaft 120 and gear wheel 122. Output response of actuator 40 during performance of its shifting function is therefore variable and nonlinear relative to the select unit input.

During the shifting operation, the lateral movement of shift link 86 laterally relative to stub shaft axis 140, in response to rotation of the stub shaft 120 by $\pm\alpha$ about axis 140, is transmuted to movement of shift control member 160 along the Y-direction between the neutral gear position and a gear engagement position in a shift gate as follows: Elongate shift rod 162 is an actuator output member that is supported by actuator bracket 50 and transmission housing 52 through bearings that permit axial movement along, and rotational movement about, shift rod axis or actuator output axis 164. A first end 166 of shift rod 162 has shift arm 168 fixed to it that extends radially from axis 164. Shift arm 168 as shown may have a rectangular cross section in a plane parallel to axis 164, and a thickness in the direction of axis 164 that is closely fitted to the width of and slidable along a slot 170 formed in shift link guide 64 of select unit 60.

Figure 2:
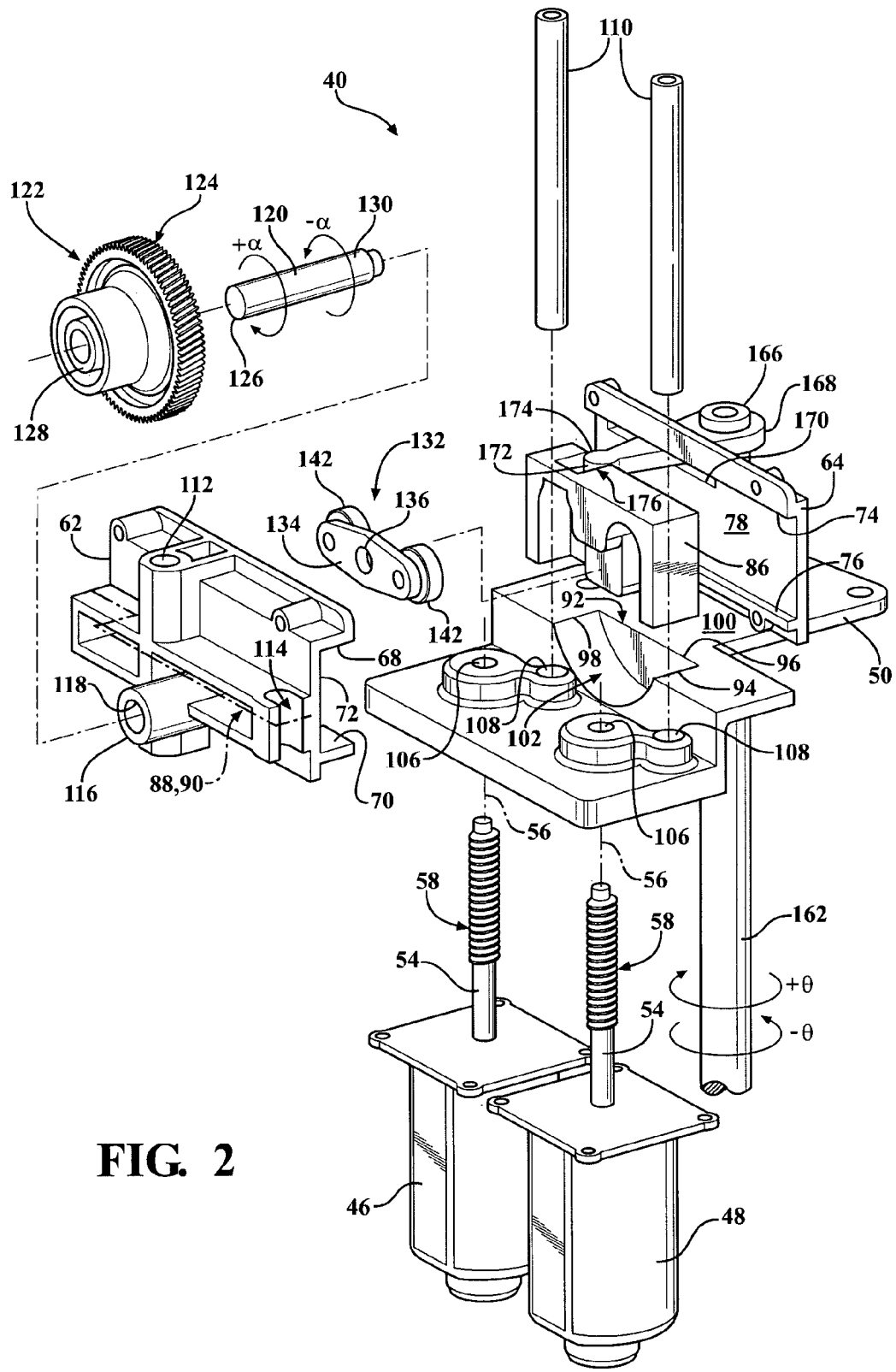
FIG. 2 is an exploded view of the gear change actuator shown in FIG. 1.
Figure 13:
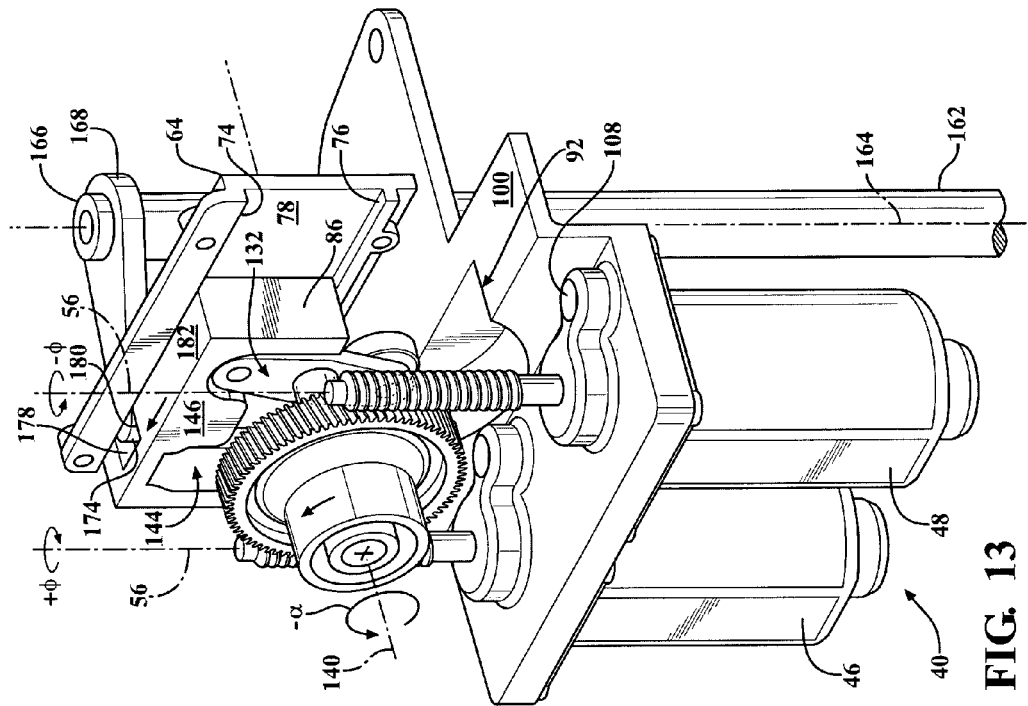
FIG. 13 is a partial perspective view similar to FIG. 12, showing the actuator in a gear engagement position.
Figure 12:
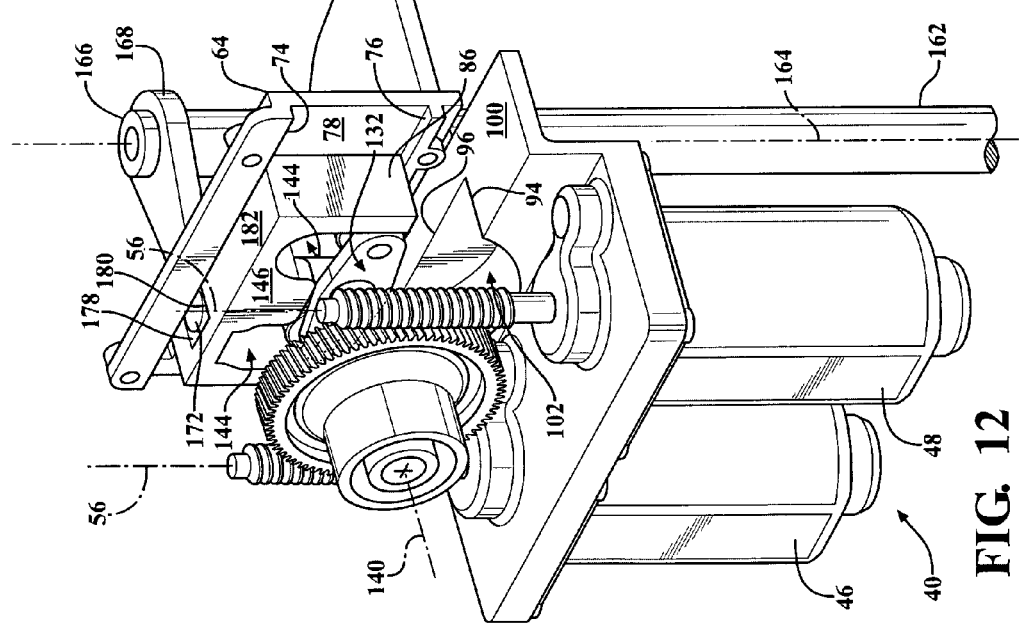
FIG. 12 is a partial perspective view of the gear change actuator, showing it in a neutral gear position, the select link member shown removed.

Slot 170 extends substantially parallel and adjacent to top wall 74 of link guide 64, in back guide surface 78. Shift arm 168 extends through slot 170 into chamber 84 and the free end 172, which may have a circular edge 174, is received in a recess 176 provided in shift link 86, the recess 176 having interfacing side walls 178, 180 spaced to receive the shift arm free end 172 with a close fit. The recess 176 may have an open face in shift link top side 182, and an open end in shift link back side 184, as best seen in FIGS. 2, 12 and 13. The forced movements of shift link 86 in lateral directions along chamber 84 are transmutations of the respective select unit input motions of gear wheel 122 about axis 140, as discussed above, and are variable across the range of gear wheel rotation angles $\alpha$. The above-described lateral movements of shift link 86 along chamber 84, which are select unit output movements, induce movements of shift arm 168 along slot 170 through the abutting engagement of its circular edge 174 and one of the recess side walls 178, 180. The movement of the shift arm free end 172 induced by the laterally moving shift link 86, imparts rotational movement of shift arm 168 about shift rod axis 164, which in turn imparts a rotational movement $\theta$ of the shift rod 162 about axis 164 in proportion to the operative length A of the shift arm 168, defined as the radial distance from axis 164 to the point of contact between circular edge 174 and the recess side wall(s) 178, 180, which is substantially constant and may have a nominal length of, for example, 48 mm.

Thus, lateral movement of the shift link 86 along chamber 84 induces rotational movement $\pm\theta$ of shift rod 162. At the laterally centered, neutral gear position of shift link 86 shown in FIG. 9, corresponding to angle $\alpha$ being 0°, the rotation angle $\theta$ of shift rod 162 is also defined as being 0°. The rotation of M-link 132 through an angle of $-\alpha$, which forces shift link leftward as viewed in FIG. 10, induces a corresponding, variably proportional rotation of shift rod 162 through an angle of $-\theta$, as best seen with reference to FIGS. 2 and 3. Conversely, rotation of M-link 132 through an angle of $+\alpha$, which forces shift link rightward as viewed in FIG. 11, induces a corresponding, variably proportional rotation of shift rod 162 through an angle of $+\theta$, as best seen with reference to FIGS. 2 and 4.

Figure 4:
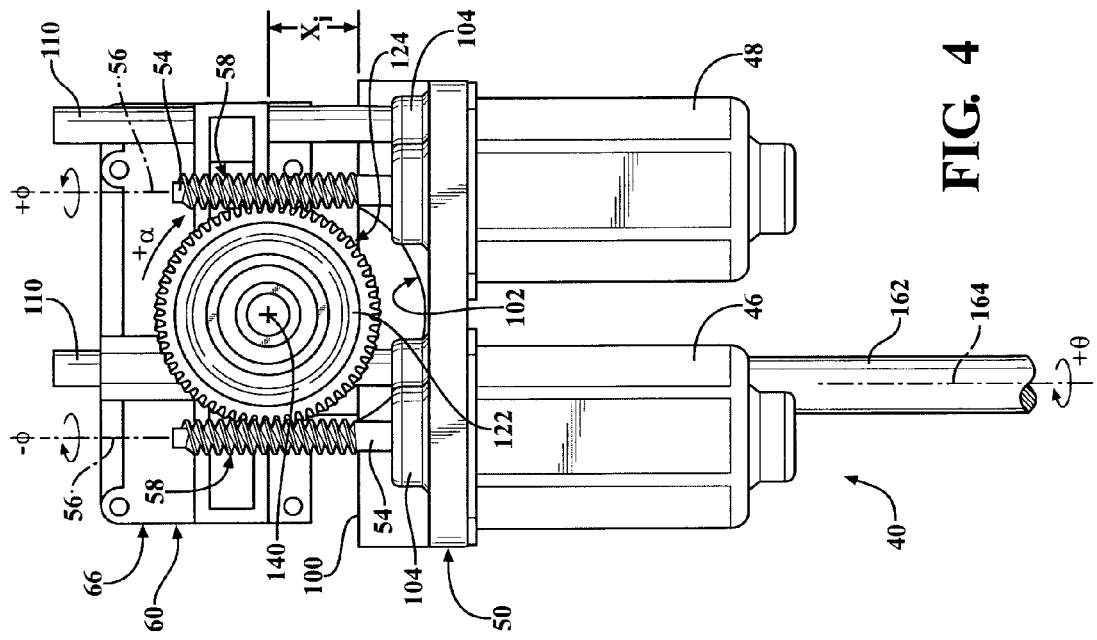
FIG. 4 is a front elevation similar to FIG. 3 during a shift in the opposite Y-direction along the same gate.
Figure 3:
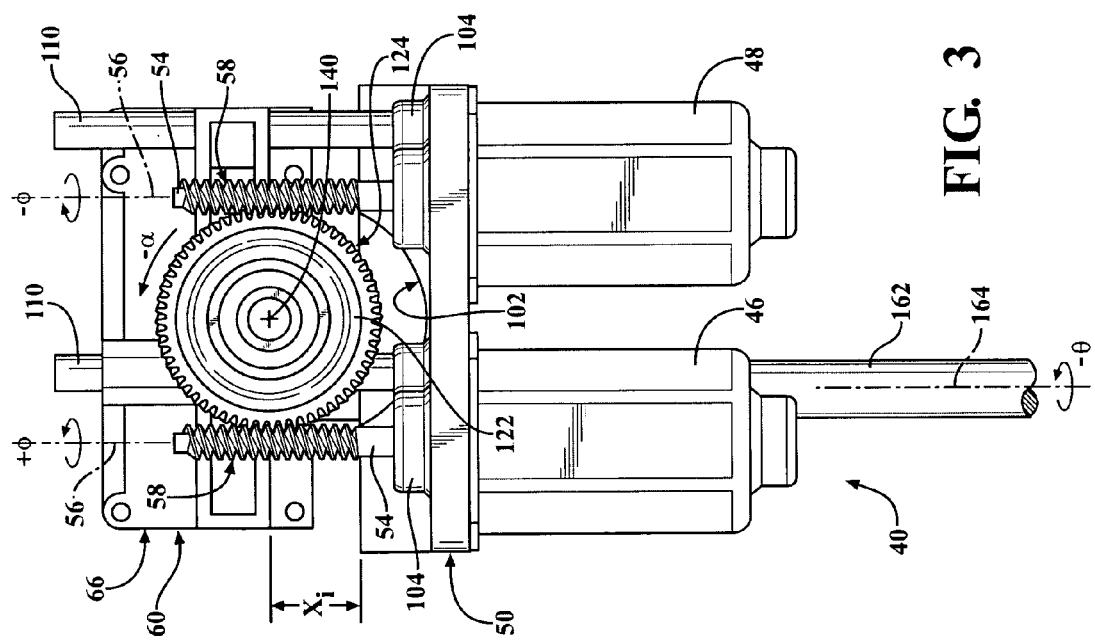
FIG. 3 is a front elevation of the gear change actuator during a shift in a Y-direction along a gate.

Referring to FIGS. 3 and 4, movement from a selected position Xi which could correspond to any shift control member position, or corresponding shift lever interface position, along the X-direction in one of shift gates A-D, by operating motors 46, 48 in concert, i.e., simultaneously rotating them about their axes 56, at a common speed but in opposite directions $\pm\Phi$, imparts rotation $\pm\alpha$ to gear wheel 122 and M-link 132 while maintaining position Xi.

In FIG. 3, the shaft 54 of motor 48 is rotated in its $-\Phi$ direction about its axis 56, while shaft 54 of motor 46 is simultaneously rotated at the same speed in opposite direction $+\Phi$, at a given position Xi along the X-direction. This motor shaft rotation combination results in gear wheel 122 being rotated about axis 140 in the $-\alpha$ direction, which results in shift rod 162 being rotated in the $-\theta$ direction, while maintaining constant position Xi.

In FIG. 4, the shaft 54 of motor 48 is rotated in its $+\Phi$ direction about its axis 56, while shaft 54 of motor 46 is simultaneously rotated at the same speed in opposite direction $-\Phi$, at a position Xi along the X-direction. This shaft motor rotation combination results in gear wheel 122 being rotated about axis 140 in the $+\alpha$ direction, which results in shift rod 162 being rotated in the $+\theta$ direction, while maintaining constant position Xi. The ratio of angular movements of shaft 120 and rod 162 through angles $\alpha$ and $\theta$, respectively, is nonlinearly variable, as discussed above.

Referring now to FIGS. 5-8, select unit 60 or carrier 66 may be moved relative to bracket 50 while maintaining M-link 132 and shift link 86, and thus shift rod 162, in their respective neutral gear positions, in which a and 0 are both at 0°. Necessarily, the movement of shift control member 160 from any gate is prevented unless the shift lever interface 44 and the gear change mechanisms of all gates in transmission 42 are correspondingly positioned in their respective neutral gear positions $N_A$, $N_B$, $N_C$, and $N_D$. Movement of the select unit 60 relative to bracket 50, and thus relative to transmission housing 52 to which it is attached, accomplishes axial movement of shift rod 162 along its axis 164, which moves shift control member 160 relative to and between the gates A-D. The simultaneous rotation of motors 46, 48 about their axes 56 at a common speed and in a common direction $\Phi$ binds the threads 58 of motor shafts 54 and the teeth 124 of gear wheel 122, such that gear wheel 122, stub shaft 120 and M-link 132 cannot rotate about axis 140 and are maintained substantially at $\alpha=0°$. Thus shift link 86 is maintained at its neutral position between its first and second positions in chamber 84 during simultaneous rotation of motor shafts 54 in a common direction, and shift rod 162 is maintained substantially at $\theta=0°$. Shift finger 160 is thus maintained in its neutral gear position throughout its movement along the X-direction as it is moved between gates A-D.

Figure 6:
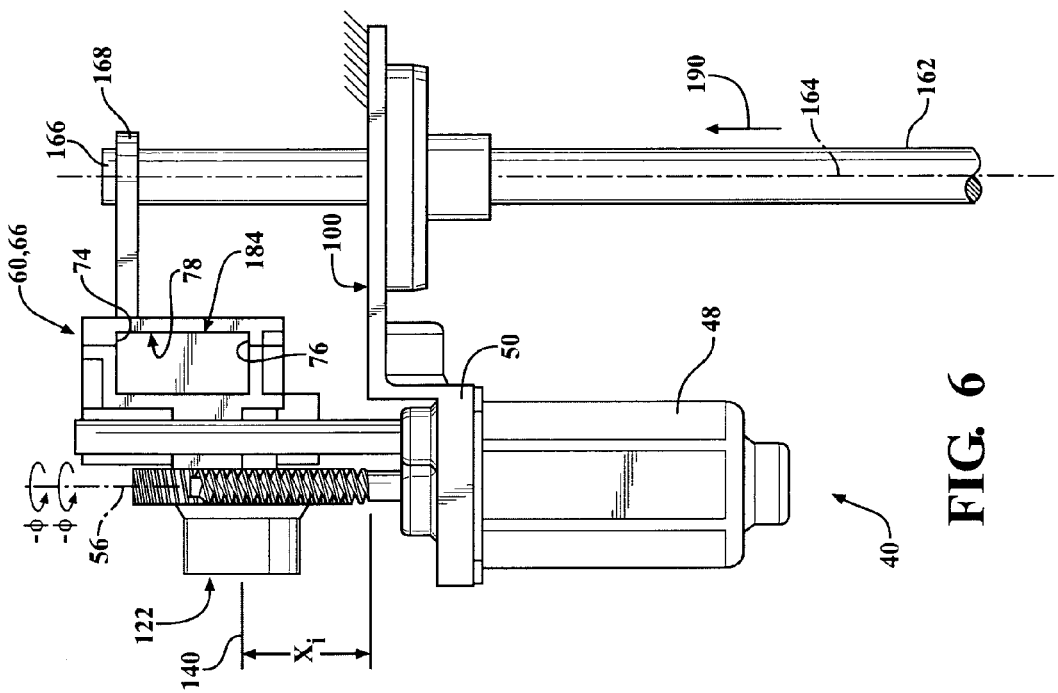
FIG. 6 is a side elevation similar to FIG. 5 during a shift between gates (X-direction)
Figure 5:
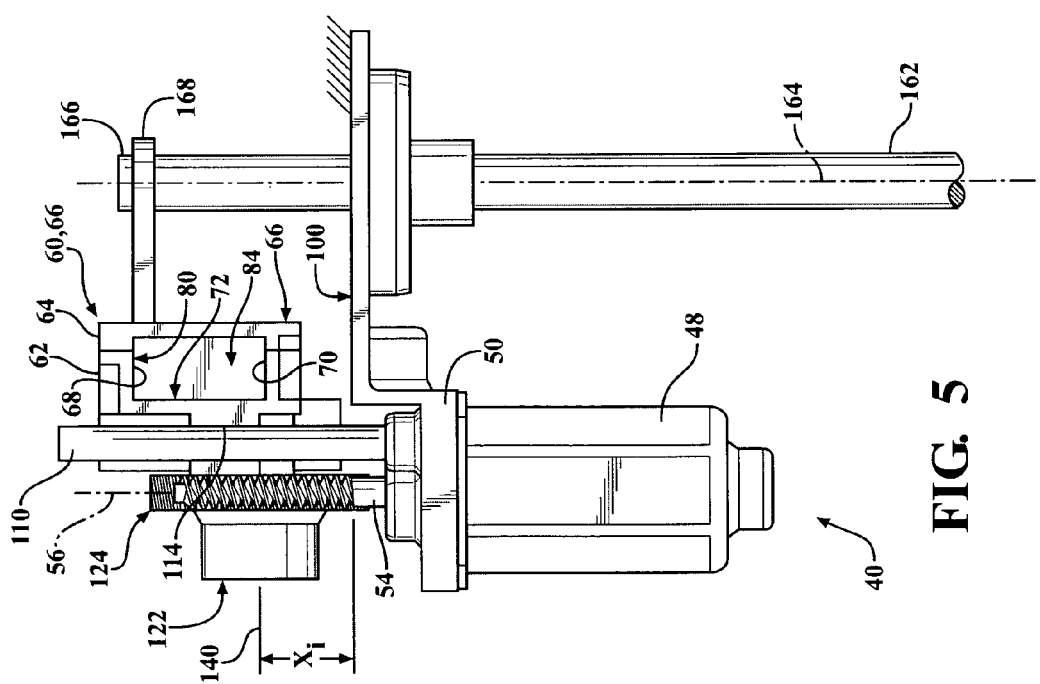
FIG. 5 is a side elevation of the gear change actuator.
Figure 8:
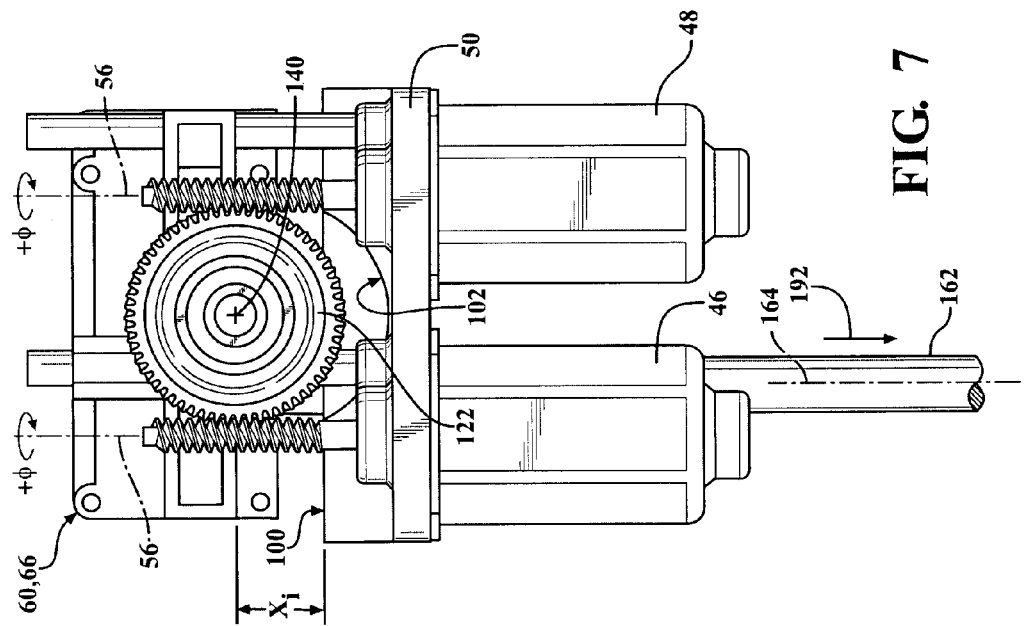
FIG. 8 is a front elevation similar to FIG. 7 during a shift in the opposite X-direction between gates.

Referring to FIGS. 6 and 8, simultaneous rotation of motor shafts 54 in their −Φ directions causes their right-hand threaded portions 58 to push the gear wheel 122 away from the motors 46, 48. The individual ones of the gear wheel teeth 124 that are located on diametrically opposite sides of gear wheel 122 and engaged with motor shaft threads 58 remain in contact with the threads and the bound gear wheel 122 is thus forced axially parallel with motor shaft axes 56 in the direction of arrow 190. Stub shaft 140, which is supported by elongated bearing 116 of select link 62, transfers the force exerted by the threads 58 on gear wheel 122 through its enmeshed diametrically opposite teeth 124, to select link bearing 116. Select link 62 is affixed to link guide 64, thereby forming carrier 66. The forced movements of carrier 66 in directions parallel with motor axes 56 are transmutations of the respective select unit input motions of gear wheel 122 in directions along motor axes 56. As noted above, shift arm 168 is closely fitted to the opposite sides of slot 170, which extends perpendicularly relative to shift rod axis 164. Forced movements of the carrier 66 in directions parallel with motor axes 56, which are select unit output movements, will impart movement to shift arm 168 through the abutting contact between one of its opposite sides and the interfacing, elongate edge of slot 170. Because shift arm 168 is fixed to shift rod 162, axial movement of shift rod 162 along its axis 164 is induced, which positions shift control member 160 along the X-direction, thereby bringing it into and out of engageable alignment with one of the axially aligned shift rail slots 194A-D of the respective gates A-D.

Figure 7:
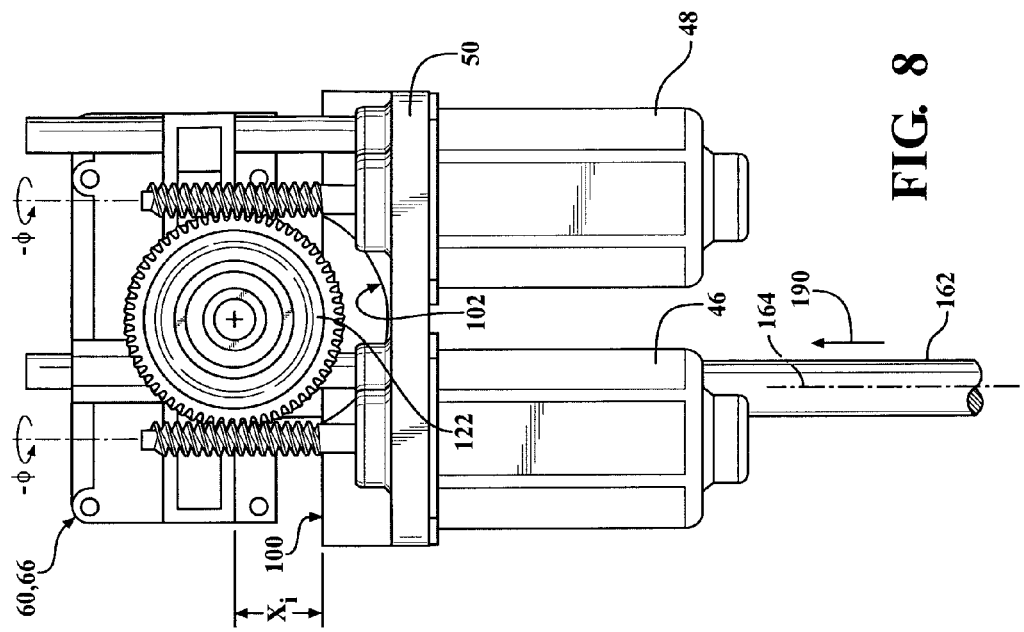
FIG. 7 is a front elevation similar to FIG. 3 during a shift in an X-direction between gates.

Conversely, with reference to FIG. 7, simultaneous rotation of motor shafts 54 in their +Φ direction causes their right-hand threaded portions 58 to pull the gear wheel 122 towards the motors 46, 48. Similarly, here the individual ones of the gear wheel teeth 124 that are located on diametrically opposite sides of gear wheel 122 and engaged with motor shaft threads 58 bind and remain in contact with the threads, and the bound gear wheel 122 is thus forced axially parallel with motor shaft axes 56 in the direction of arrow 192. The forces exerted through shaft 120 and carrier 66 act on shift arm 168 through the abutting edge of slot 170, and force shift rod 162 axially along its axis 164. Shift finger 160 is thus positioned in the X-direction to bring it into and out of engageable alignment with one of the axially aligned shift rail slots 194A-D of the respective gates A-D. The induced movement of gear wheel 122 in either direction along motor axes 56 is a select unit input motion.

The shift control member or shift finger 160, which may be configured similarly to shift arm 168, is fixed to shift rod 162 at a distance from its first end 166, and is located within transmission housing 52. The shift finger 160 extends radially from axis 164, but need not be radially aligned with shift arm 168. Nevertheless, movement of shift arm 168 about axis 164 through any angle θ will result in an identical degree of angular movement θ of shift finger 160 about axis 164, for both are rotatably fixed to shift rod 162.

Figure 14:
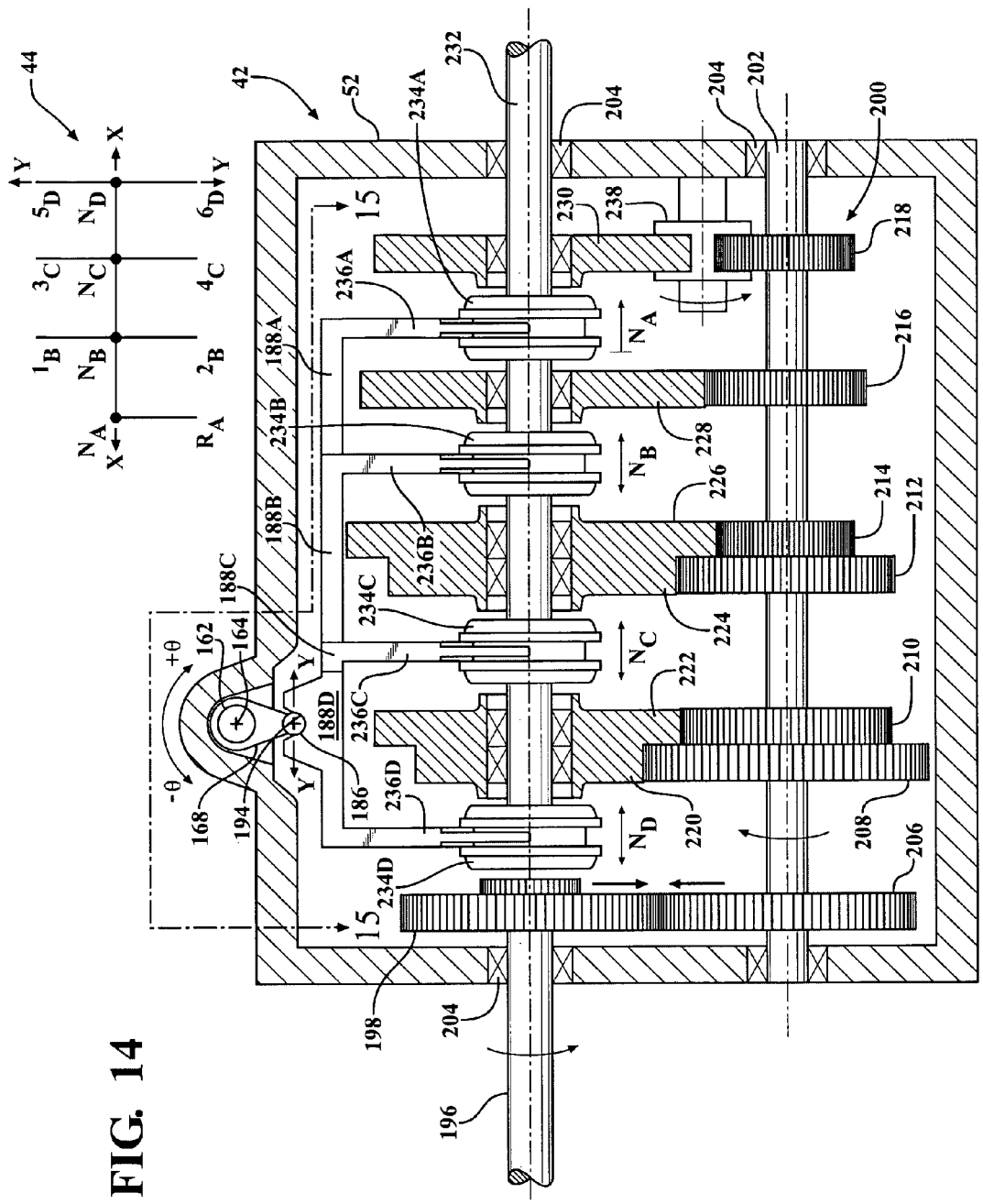
FIG. 14 is a partially sectioned side view of a six-speed manual change-gear transmission and accompanying schematic view of the vehicle operator's shift lever interface in neutral gear positions that may be any of shift control member and corresponding shift lever interface gear positions $N_A$, $N_B$, $N_C$, or $N_D$.
Figure 15A:
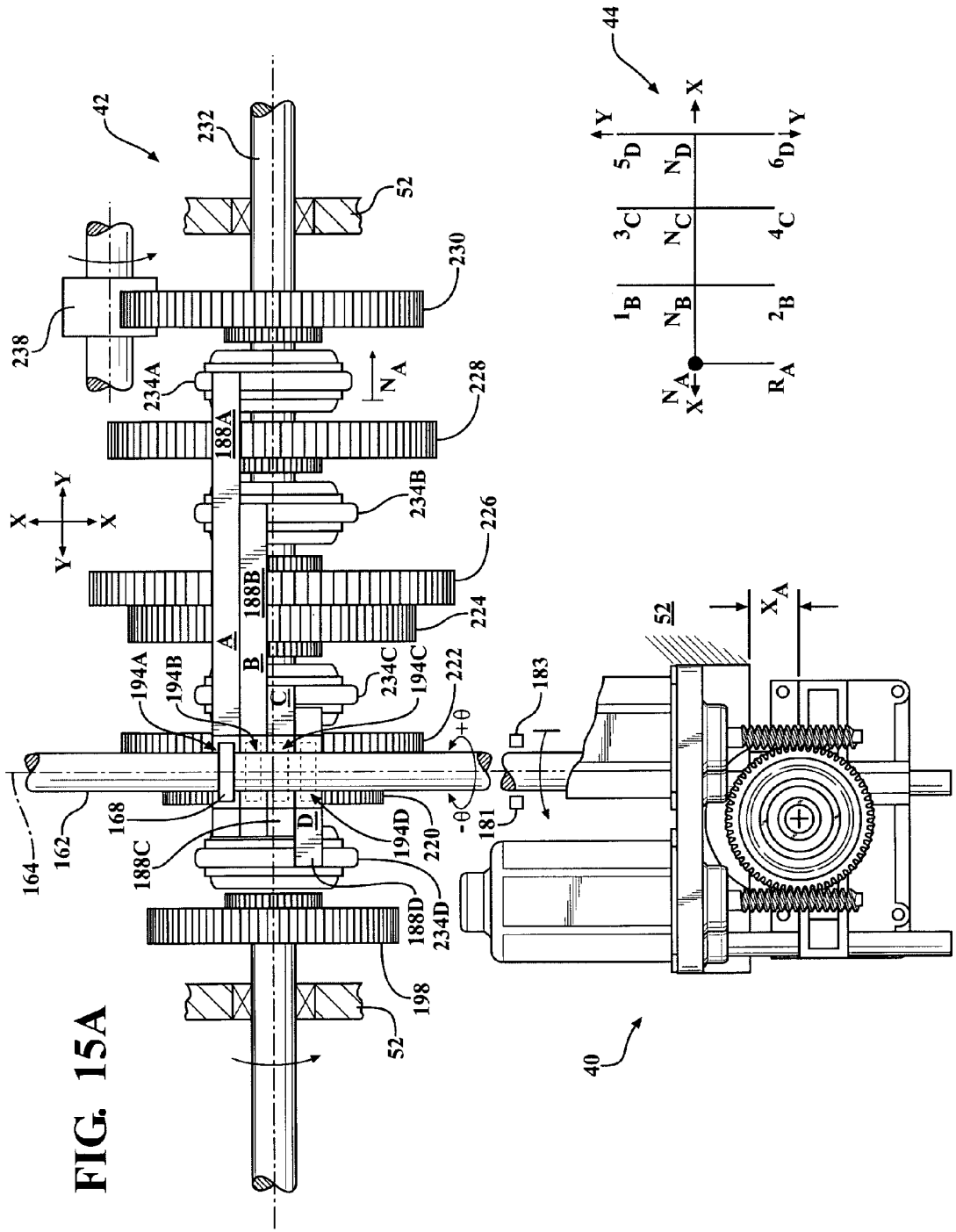
FIG. 15A is a view of the transmission of FIG. 14 along line 15-15 and the shift lever interface in the shift control member and corresponding shift lever neutral gear positions $N_A$.
Figure 15B:
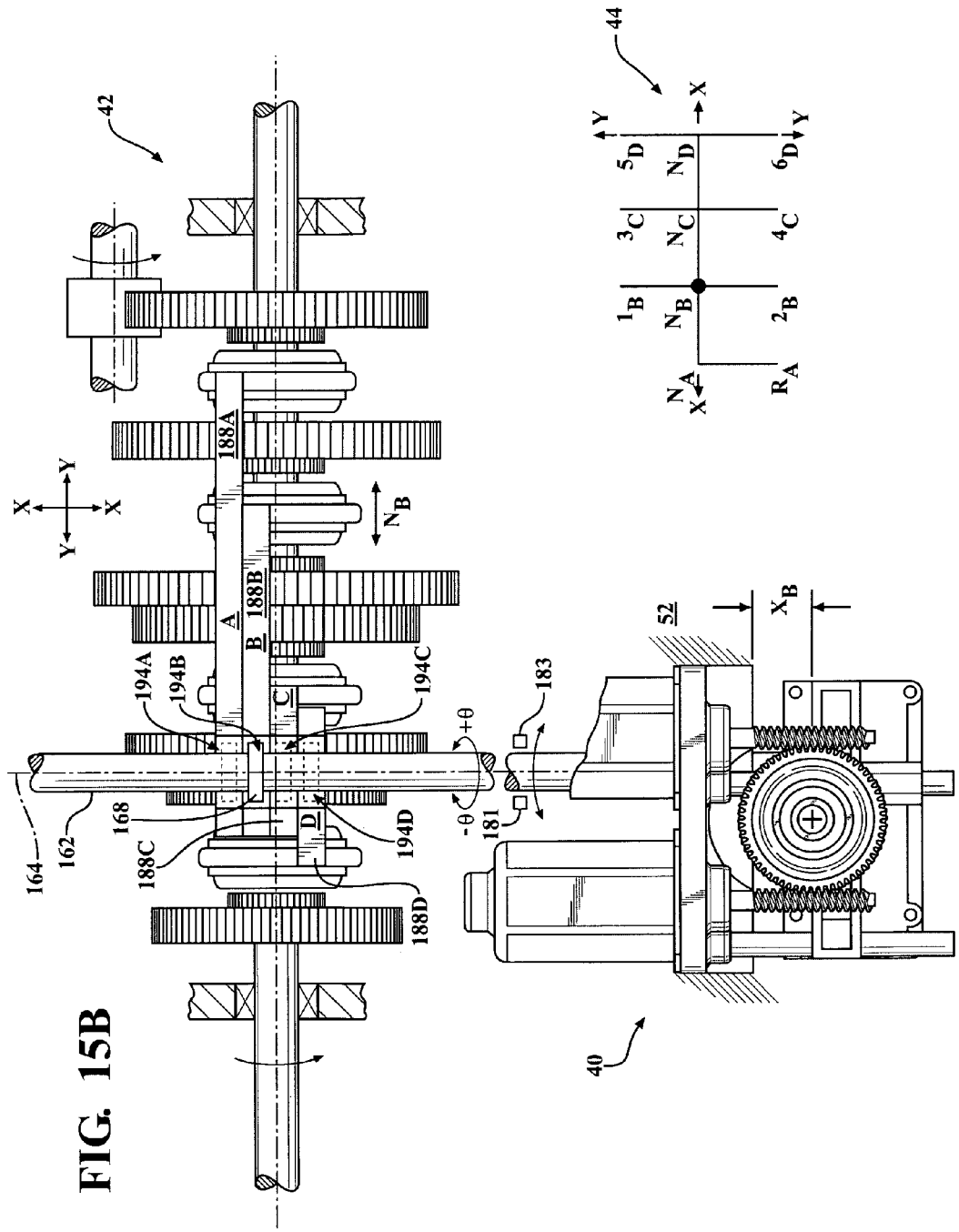
FIG. 15B is a view of the transmission of FIG. 14 along line 15-15 and the shift lever interface in the shift control member and corresponding shift lever neutral gear positions $N_B$.
Figure 15C:
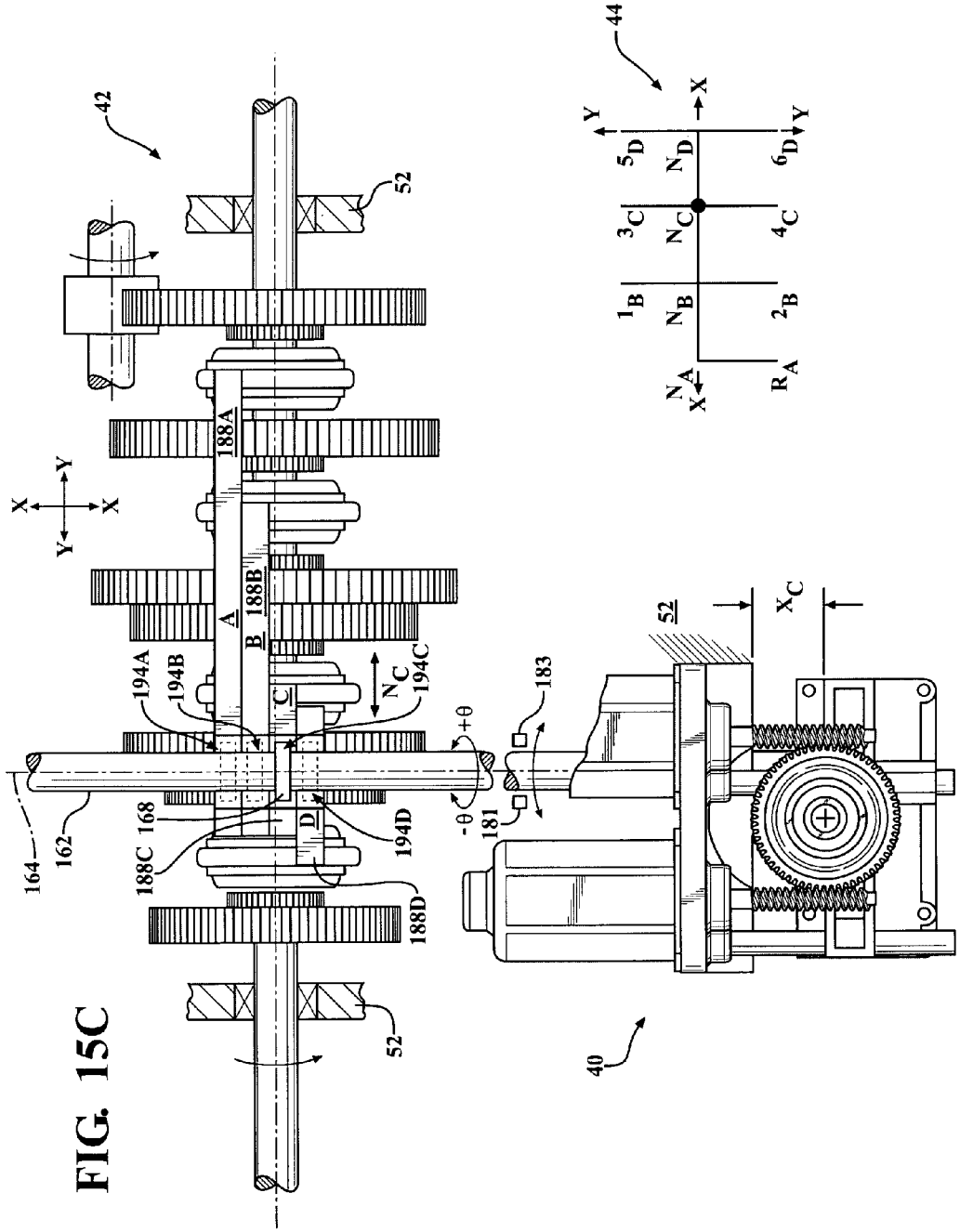
FIG. 15C is a view of the transmission of FIG. 14 along line 15-15 and the shift lever interface in the shift control member and corresponding shift lever neutral gear positions $N_C$.
Figure 15D:
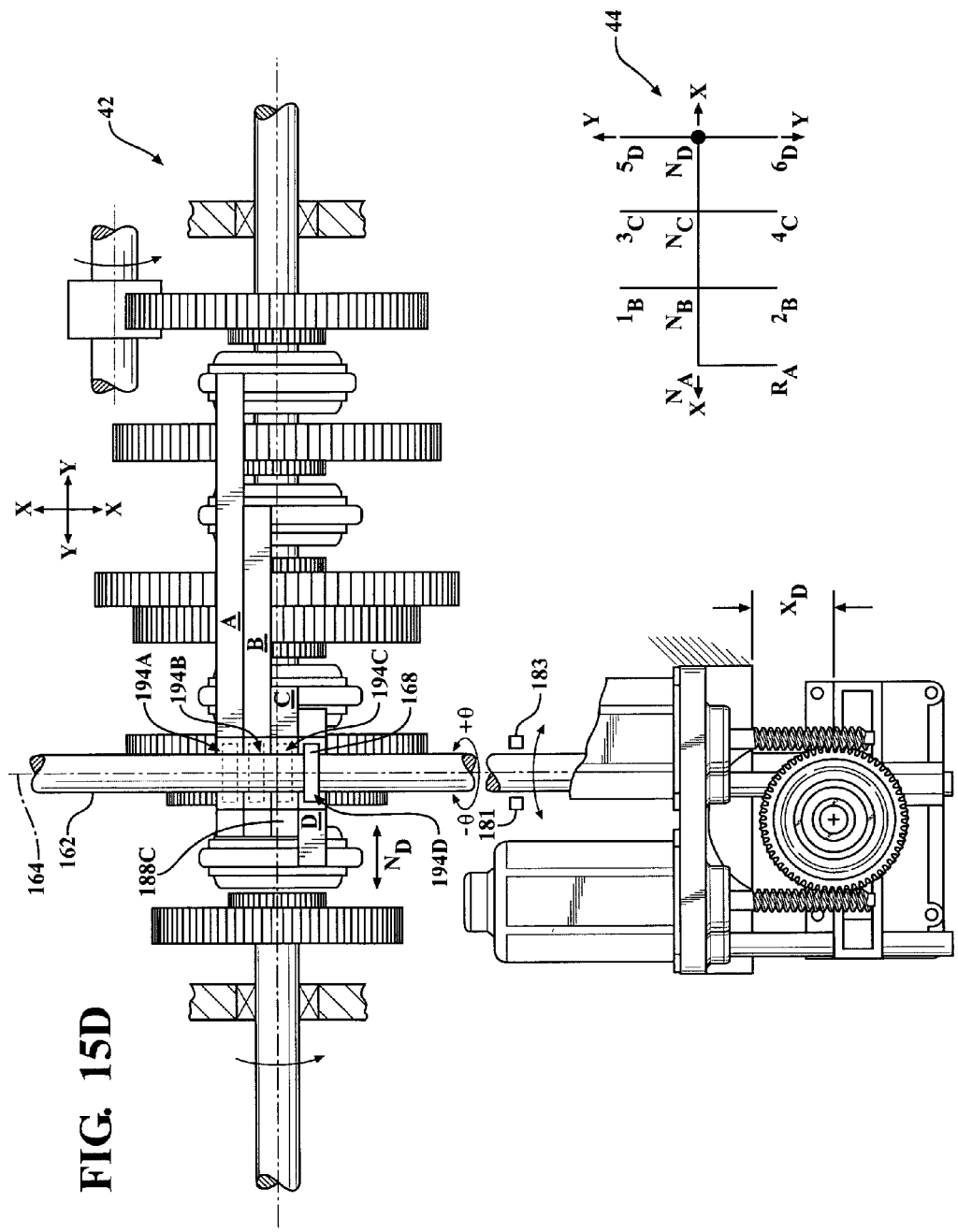
FIG. 15D is a view of the transmission of FIG. 14 along line 15-15 and the shift lever interface in the shift control member and corresponding shift lever neutral gear positions $N_D$.
Figure 16:
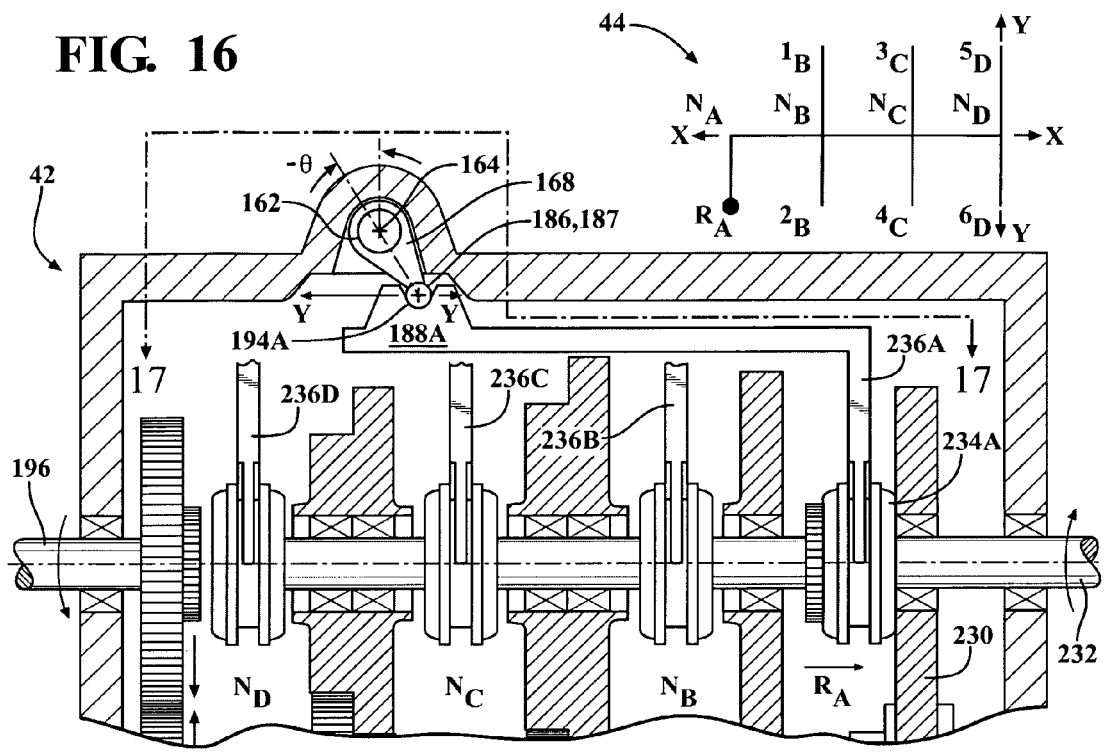
FIG. 16 is a partially sectioned and fragmented side view of the transmission of FIG. 14 and the shift lever interface in the shift control member and corresponding shift lever reverse gear positions $R_A$.
Figure 18:
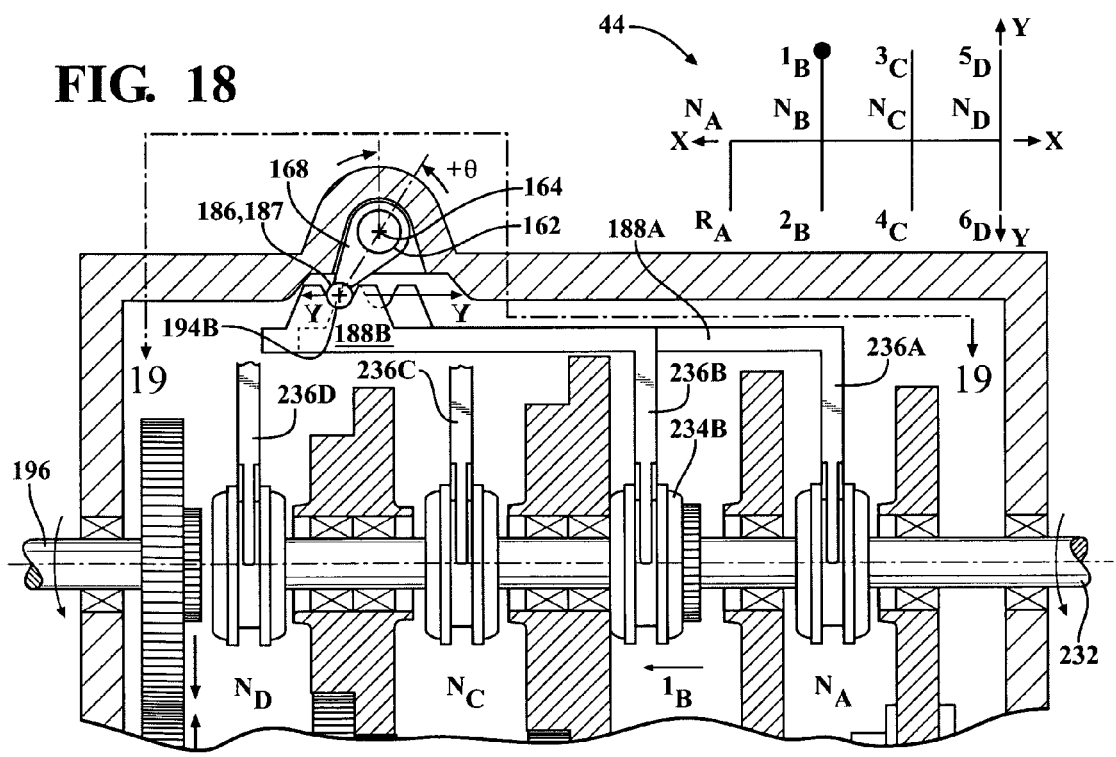
FIG. 18 is a partially sectioned and fragmented side view of the transmission of FIG. 14 and the shift lever interface in the shift control member and corresponding shift lever first gear positions $1_B$.
Figure 17:
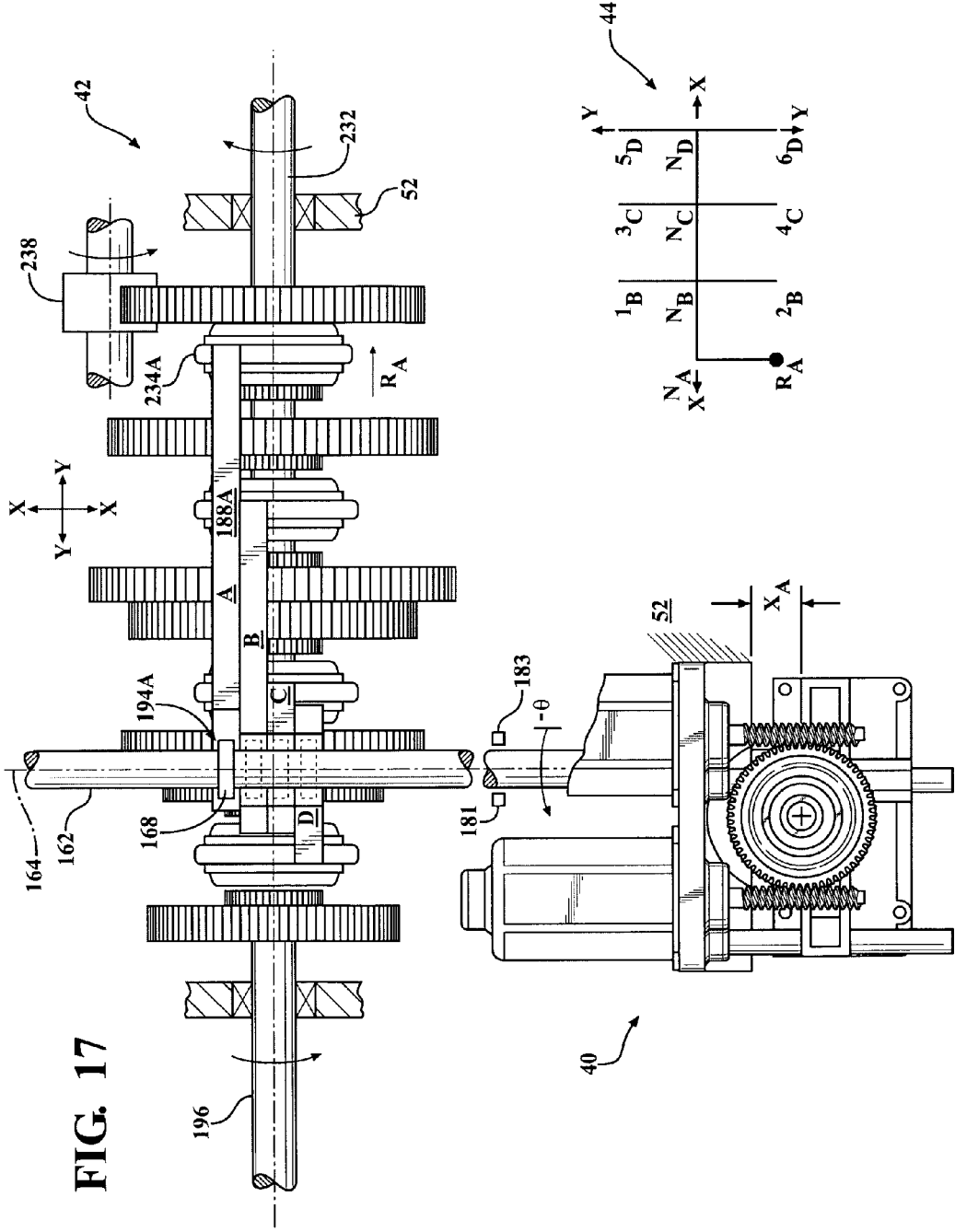
FIG. 17 is a view of the transmission of FIG. 16 along line 17-17 and its shift lever interface in reverse gear positions $R_A$.
Figure 20:
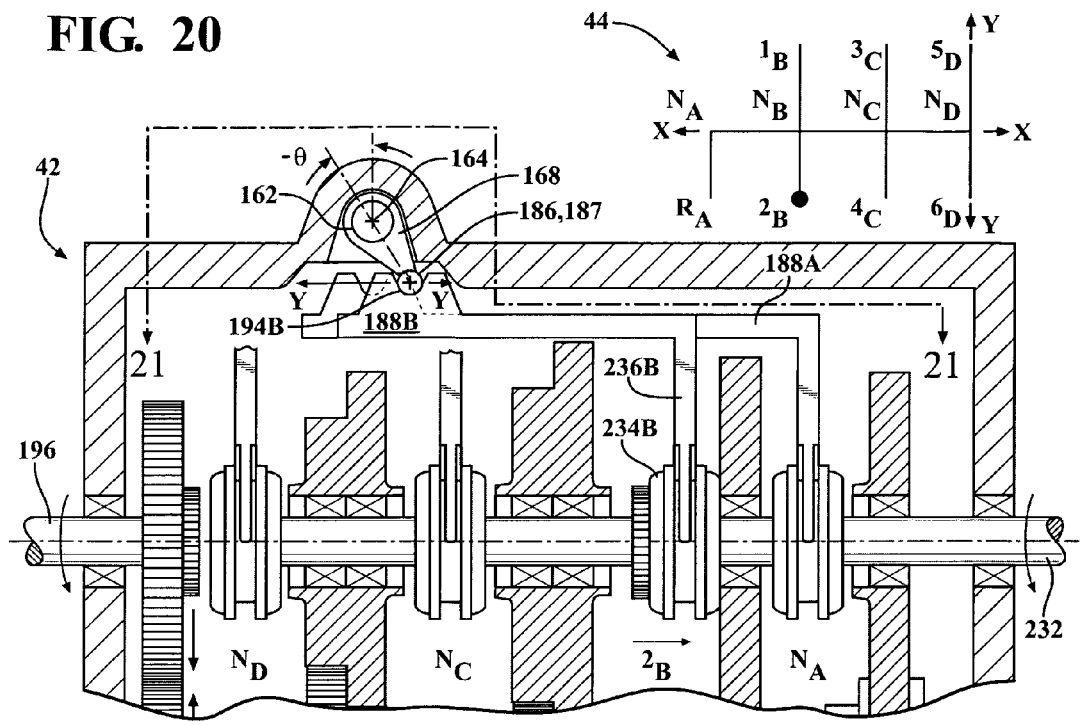
FIG. 20 is a partially sectioned and fragmented side view of the transmission of FIG. 14 and the shift lever interface in the shift control member and corresponding shift lever second gear positions $2_B$.
Figure 22:
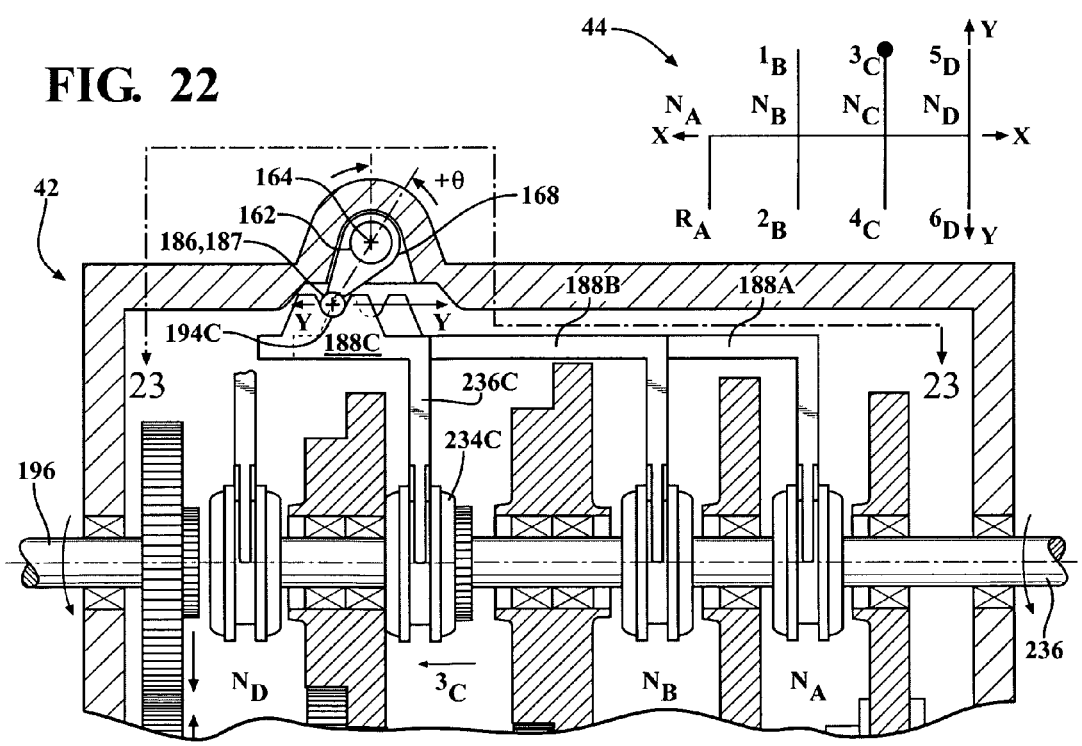
FIG. 22 is a partially sectioned and fragmented side view of the transmission of FIG. 14 and the shift lever interface in the shift control member and corresponding shift lever third gear positions $3_C$.
Figure 21:
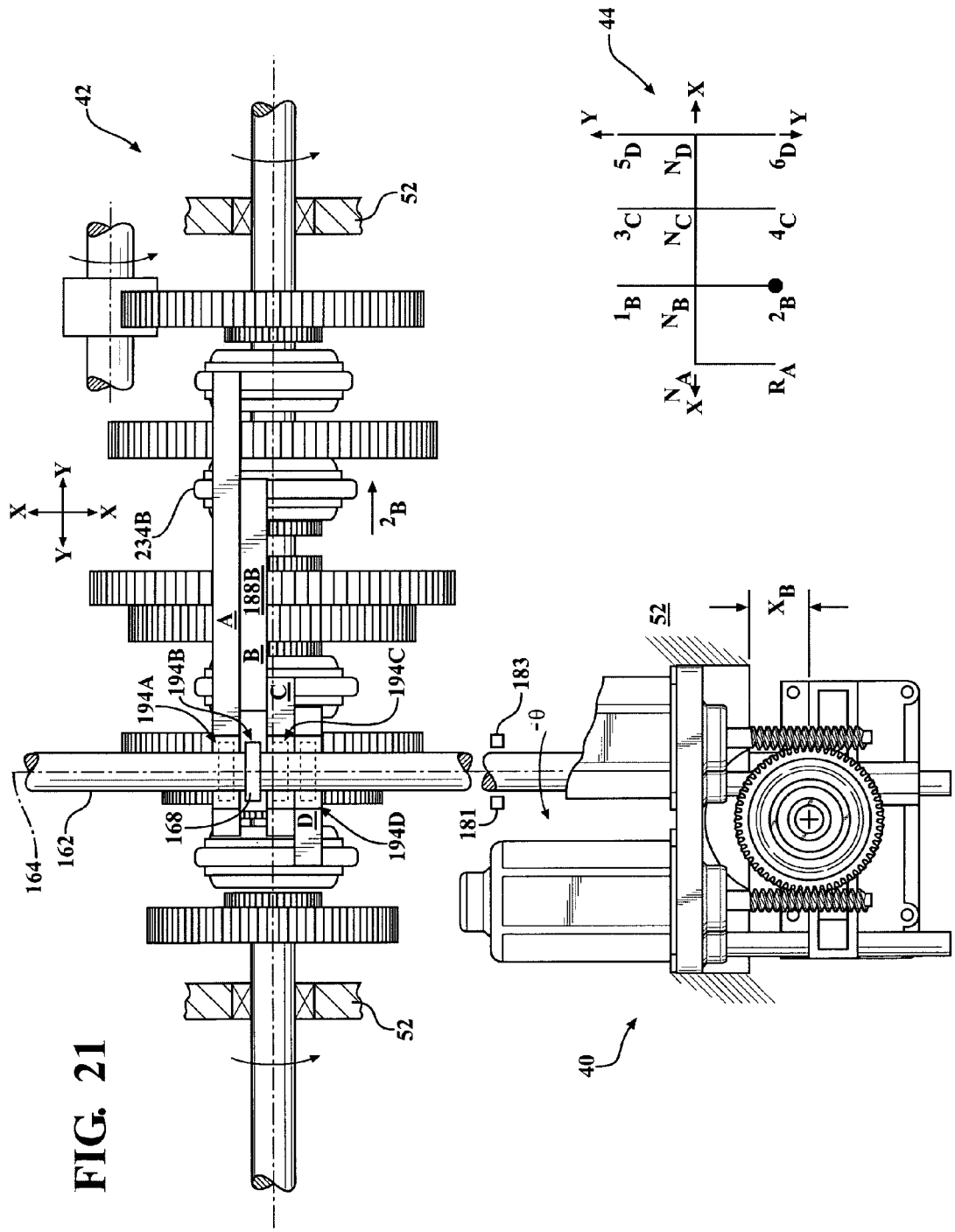
FIG. 21 is a view of the transmission of FIG. 20 along line 21-21 and its shift lever interface in second gear positions $2_B$.
Figure 23:
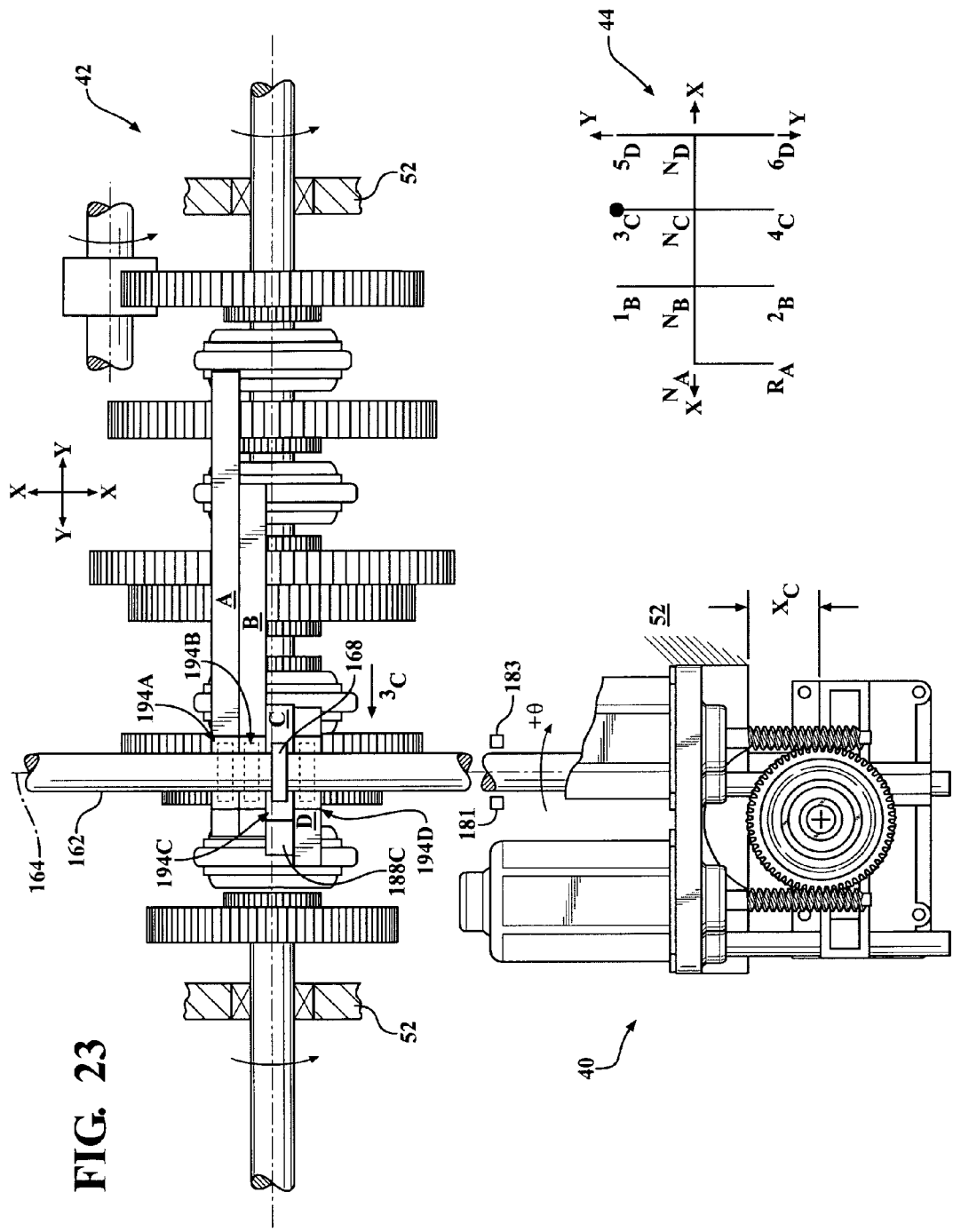
FIG. 23 is a view of the transmission of FIG. 22 along line 23-23 and its shift lever interface in third gear positions $3_C$.
Figure 24:
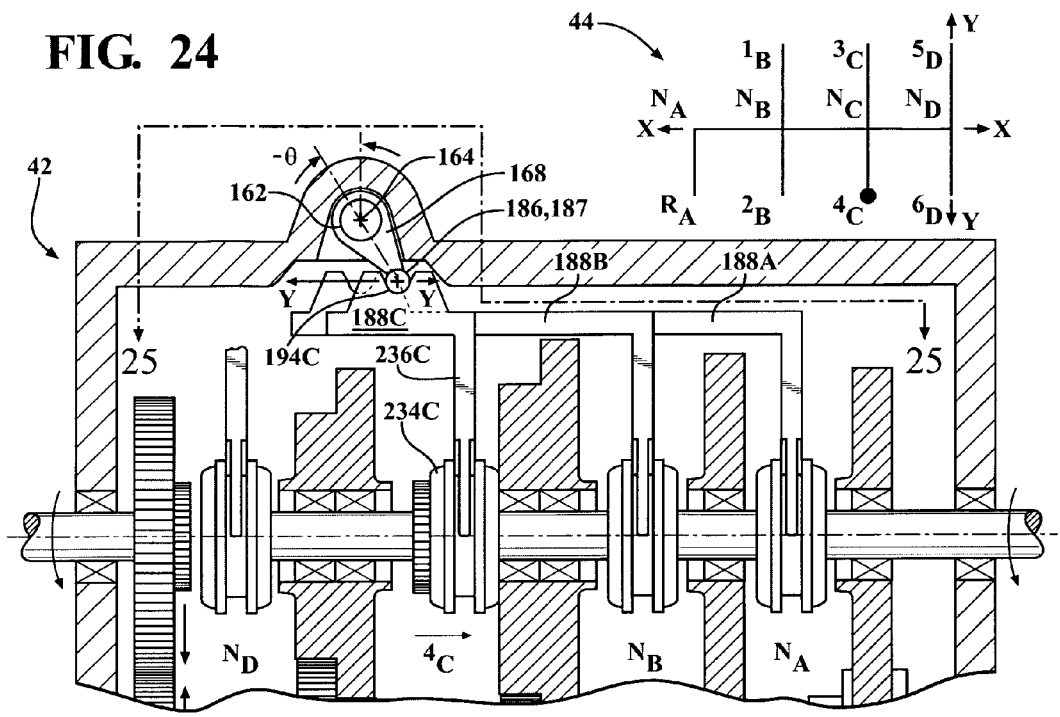
FIG. 24 is a partially sectioned and fragmented side view of the transmission of FIG. 14 and the shift lever interface in the shift control member and corresponding shift lever fourth gear positions $4_C$.
Figure 26:
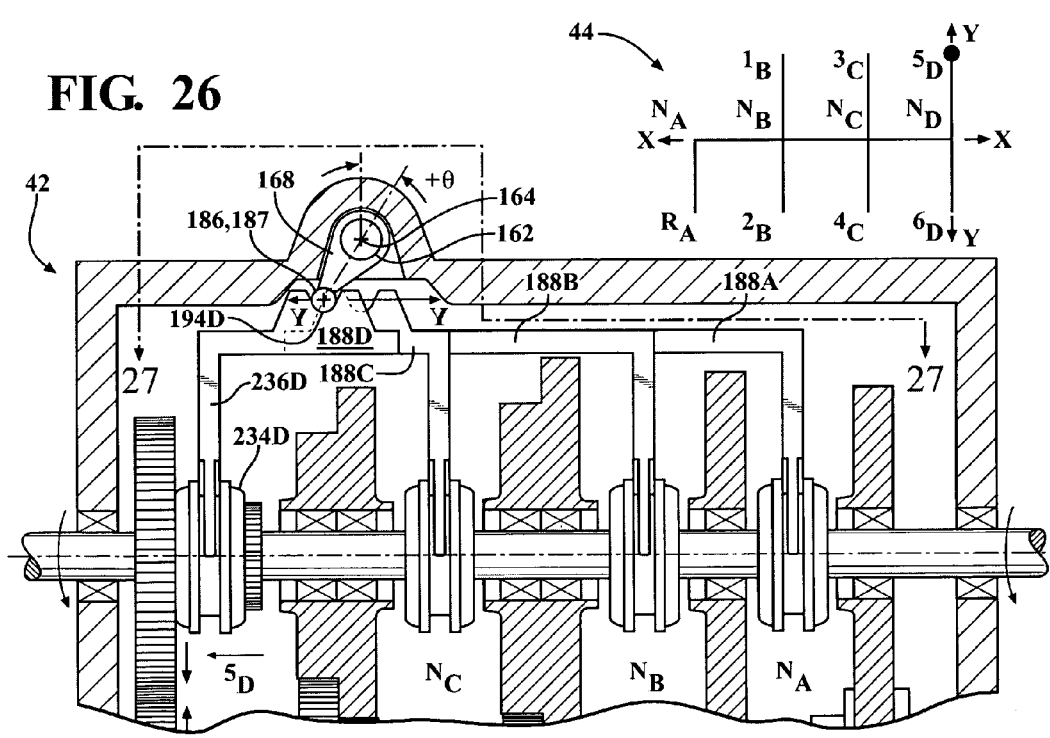
FIG. 26 is a partially sectioned and fragmented side view of the transmission of FIG. 14 and the shift lever interface in the shift control member and corresponding shift lever fifth gear positions $5_D$.
Figure 25:
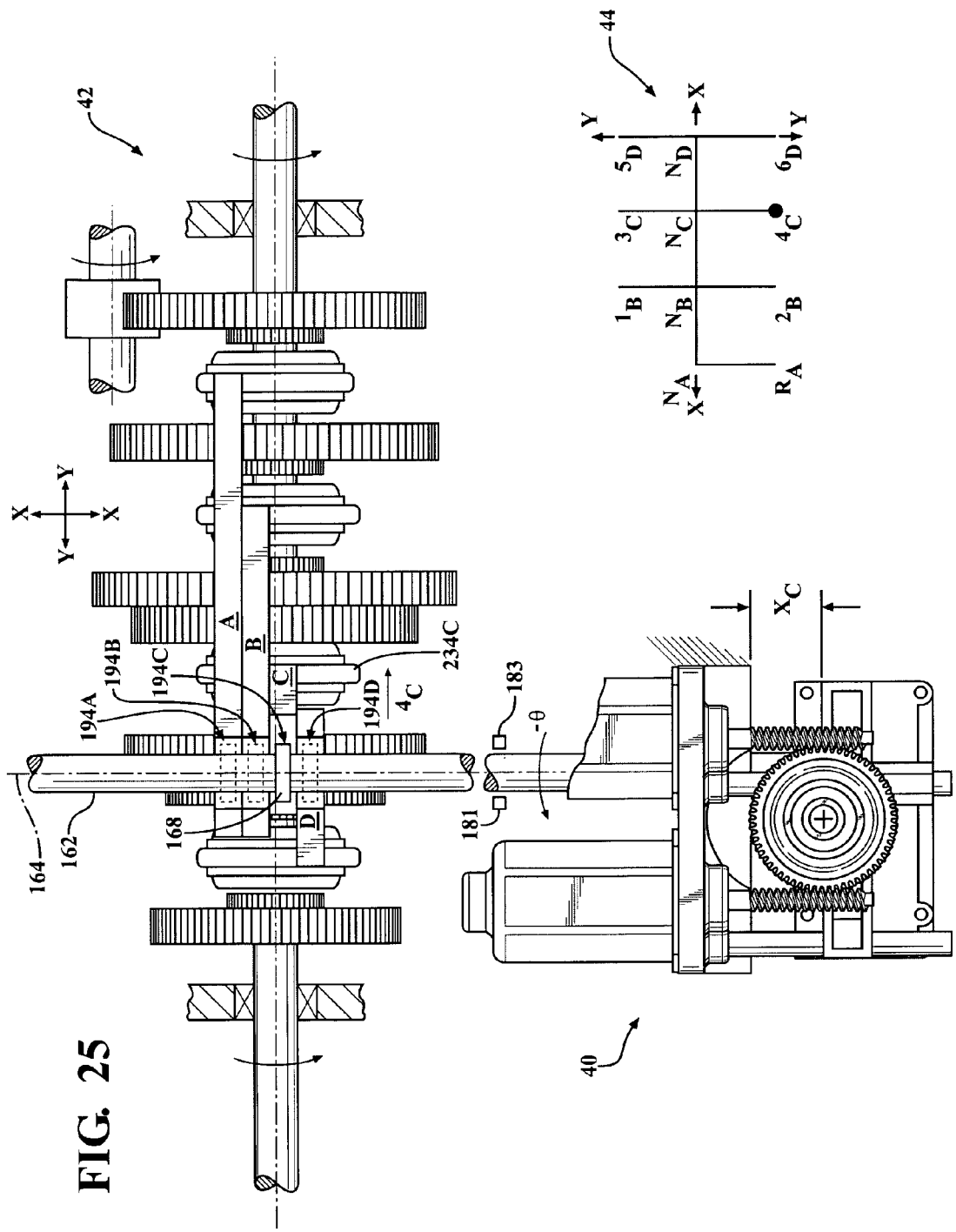
FIG. 25 is a view of the transmission of FIG. 24 along line 25-25 and its shift lever interface in fourth gear positions $4_C$.
Figure 27:
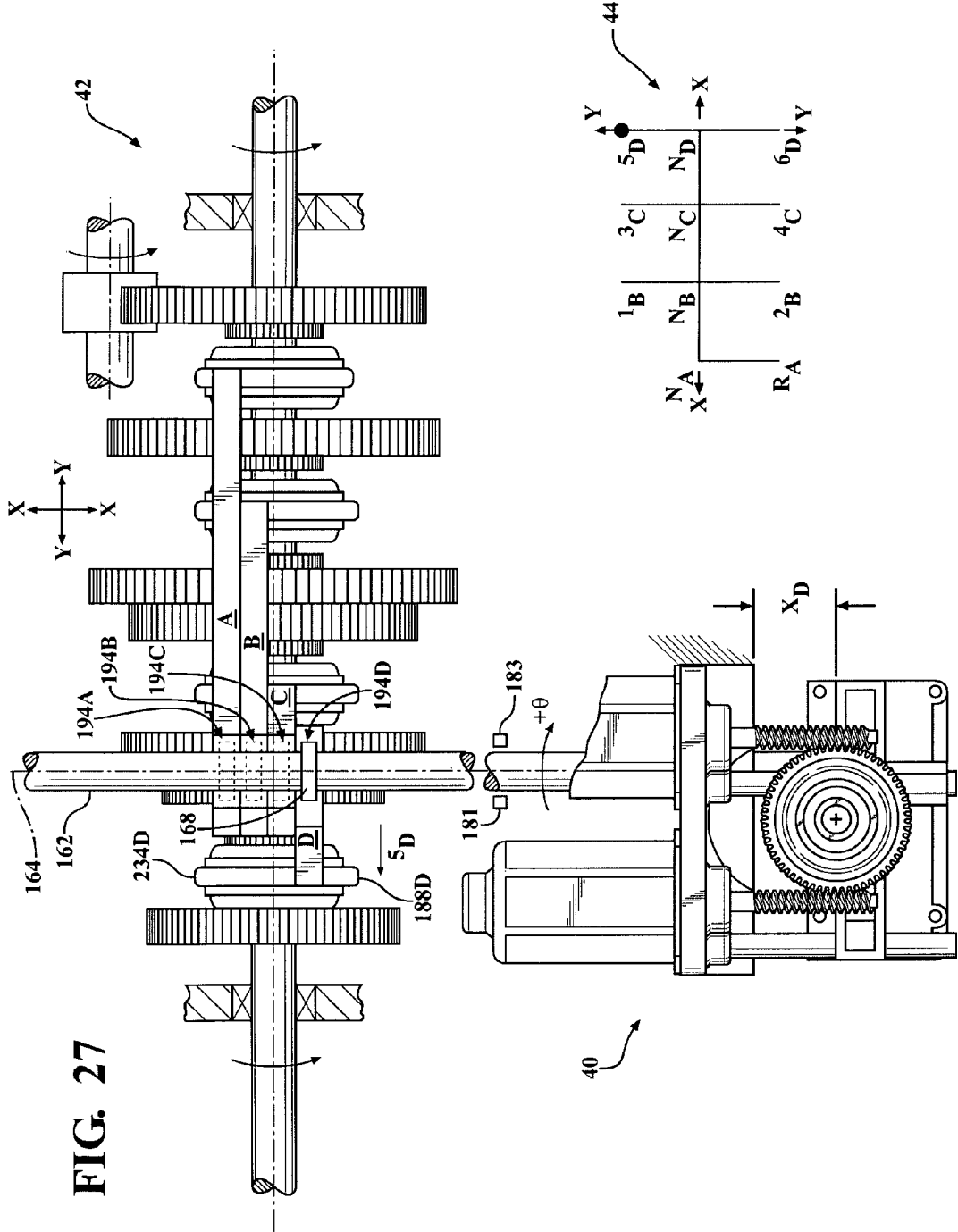
FIG. 27 is a view of the transmission of FIG. 26 along line 27-27 and its shift lever interface in fifth gear positions $5_D$.
Figure 28:
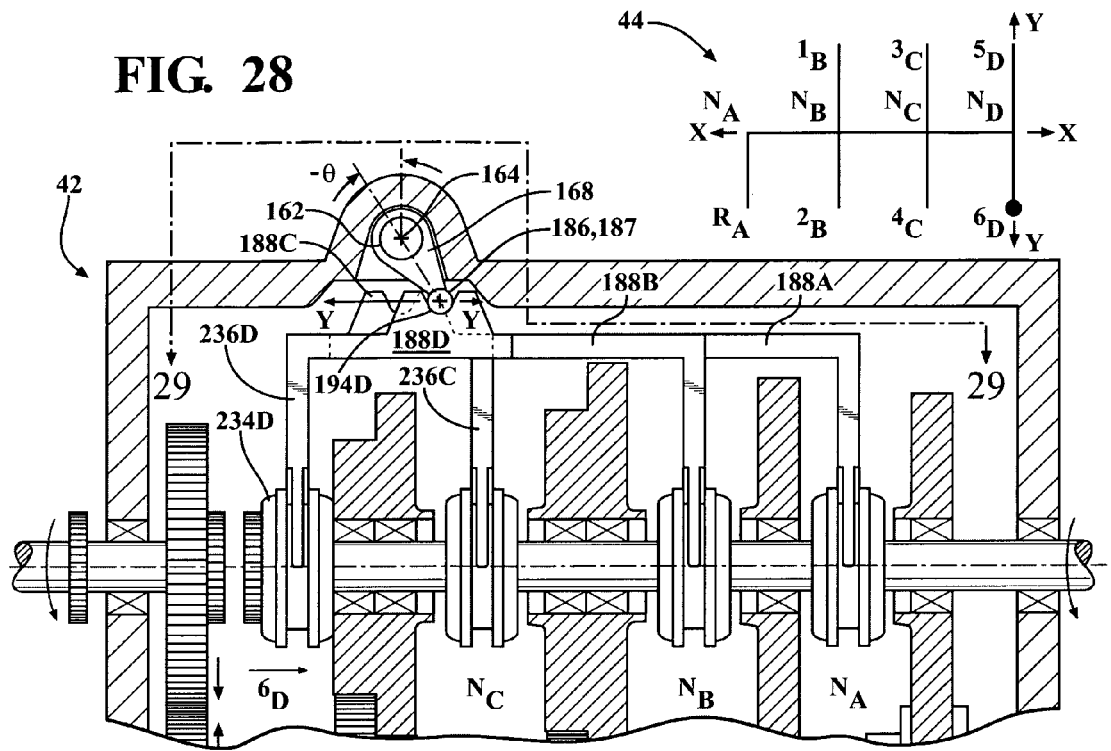
FIG. 28 is a partially sectioned and fragmented side view of the transmission of FIG. 14 and the shift lever interface in the shift control member and corresponding shift lever sixth gear positions $6_D$.

Within the single gate A-D with which shift control member 160 is positioned along the X-direction, rotational movement of the shift rod 162 through angle θ imparts movement to the shift finger tip 186 along the Y-direction between the neutral gear position and a gear engaging position. Shift finger tip 186 may be provided with a circular edge 187 against which engages shift rails 188. Referring to FIG. 14, in which the shift control member 160 and all shift rails 188A-D are shown in their respective neutral gear positions $N_A$, $N_B$, $N_C$, and $N_D$, the rotational angle θ of shift rod 162 about its axis 164 is 0°. Rotation of the shift rod 162 by an angle of +θ will correspondingly displace the tip 186 of shift finger 160 leftward as viewed in FIG. 14, along the Y-direction to a $1_B$-$3_C$-$5_D$ gear engagement position (see FIGS. 18, 22, 26). Conversely, rotation of the shift rod 162 by an angle of −θ will correspondingly displace the tip 186 of shift finger 160 rightward as viewed in FIG. 14, along the Y-direction to a $R_A$-$2_B$-$4_C$-$6_D$ gear engagement position (see FIGS. 16, 20, 24, 28). Thus, rotational positioning the shift rod 162 about its axis 164 through an angle θ, is transmuted into linear movement of gear change mechanism shift rail 188 along the Y-direction. This is accomplished in the gear change mechanism through the abutting engagement of the circular edge 187 of finger tip 186, and one of the side walls 195, 197 (FIGS. 31-34) of the slot 194 formed in the shift rail 188. The movement of the shift finger tip 186, which is induced by rotation ±θ of shift rod 162 about its axis 164, imparts linear movement of the shift rail 188 in a Y-direction substantially perpendicular to axis 164. The imparted shift rail linear movement is in proportion to the operative length B of shift finger 160, defined as the radial distance from axis 164 to the point of contact between circular finger tip edge 187 and the slot wall(s) 195, 197, which is substantially constant, and may be nominally 24 mm.

The duration of the motor rotations may be controlled via the motor controller using known open loop techniques if stepping motors are used, or known closed loop techniques if servomotors are used. Shift rod 162 is preferably in operative communication with sensors 181, 183, which may be analog sensors, of known type that are connected with the shift actuator electronic controller module M (similar to that shown in FIG. 30), and respectively sense shift rod 162 movements during shifting and selection operations.

The gear train of transmission 42 is housed within housing 52 and includes an input shaft 196 driven by a prime mover such as diesel or gasoline engine E through a selectively disengaged, normally engaged master friction clutch C, as described above with reference to FIG. 30.

Referring to FIG. 14, transmission input shaft 196 carries an input gear 198 for driving a countershaft assembly 200, which includes countershaft 202 supported by bearings 204 in housing 52. Input shaft 196 is similarly supported by a bearing 204 in housing 52. The countershaft 202 is provided with countershaft gears 206, 208, 210, 212, 214, 216, and 218 fixed for rotation therewith. The countershaft gears are respectively paired and rotatably coupled to input gear 198 and a plurality of mainshaft gears 220, 222, 224, 226, 228, and 230, as best seen in FIG. 14. The mainshaft gears surround and are rotatable about the mainshaft or output shaft 232. Input gear 198 and the mainshaft gears are selectively clutchable, one at a time, to the mainshaft 232 for rotation therewith by sliding control collars 234A-D into engagement therewith, as is well known in the art. Control collar 234D may be utilized to clutch input gear 198 to mainshaft 232, to provide a direct drive relationship between input shaft 196 and mainshaft 232 in fifth gear, as discussed above.

Mainshaft gear 230 is the reverse gear and is in continuous meshing engagement with its associated countershaft gear 218 through a conventional intermediate idler gear 238 rotatably supported in housing 52.

The respective control collar 234A-D of each gate A-D is axially positioned between the neutral gear position and the gear engagement positions through movement along the Y-direction of its respective shift fork 236A-D, which is fixed to move axially with its respective shift rail 188A-D. The shift rail 188, control collar 234 and shift fork 236 define the gear change mechanism of each gate. Control collars 234 may be of the well known synchronized or nonsynchronized double acting jaw clutch type. As noted above, within each gate, the ratio of relative angular movements of shaft 120 and shift rod 162 is variable between the neutral gear position and the gear engagement position(s). In other words, select unit 60 provides actuator 40 with a variable output response for performing its shifting function.

When the actuator 40 is performing the shifting function, effecting movement of the gear change mechanism in the Y-direction, the electric motors 46, 48 are rotating their respective shafts 54 in opposite rotational directions, i.e., one in the +Φ direction and the other in the −Φ direction, as shown in FIG. 3 or 4. The shafts 54 rotate the gear wheel 122 and, via rotation of stub shaft 120 through angle ±α, toggle the M-link 132 into or out of one of the first or second recess 144 of the shift link 86, depending on the directions of rotation of the respective motor shafts 54, as best understood with reference to FIGS. 9-11. Within the selected gate, at a constant X-direction position, when the M-link 132 is toggled from its full engagement with one of the recesses 144 to the other (i.e., shaft 120 moves through an angle of about 180° or 2α), the transmission is shifted between the gate's pair of gear engagement positions, and through the gate's neutral gear position. Alternatively, the M-link 132 may be stopped between the first and second recesses 144 in the neutral gear position (i.e., substantially at α=0°), in which the transmission 42 is not in any gear, and the shift control member 160 may be moved to another gate, along the X-direction, through the selection function.

When the actuator 40 is performing the selection function, which would occur with the M-link 132 in its neutral gear position so that slots 194 of all transmission shift rails 188 are aligned along the axis 164 of the shift rod 162, the electric motors 46, 48 are rotating their respective shafts 54 in a common direction, i.e., both of the shafts 54 are rotated in either the +Φ or the −Φ direction. Due to this rotational relationship between the shafts 54, the gear wheel 122 is in a bound state, and does not rotate about its axis 140, and the gear wheel is forced along shafts 54. Because the gear wheel 122 is held against rotation about its axis 140, M-link 132 is likewise held in its neutral gear position centrally along the Y-direction, and α and θ are both held at 0°. In other words, during performance of the selection function, the select unit 60 is forced axially, relative to the motors 46, 48, in one of two directions along shift rod axis 164, depending on the direction of rotation of motor shafts 54. As the bound gear wheel 122 moves along the motor shafts 54, the select unit 60 is moved relative to the motors 46, 48 in a direction along shift rod axis 164. Axial movement of shift rod 162 carries its shift finger 160 between gate-selection positions along the gates' shift rail slots 194, which are aligned along axis 164 in their neutral gear positions $N_A$, $N_B$, $N_C$, $N_D$.

FIGS. 16-29 show the gear engagement positions of each of the shift rails 188A-D and their respective control collars 234A-D.

Referring to FIGS. 31 through 34, shown are several positions of an example shifting mechanism within actuator 40 and gear change mechanism within transmission 42, between the neutral gear position and a gear engagement position, demonstrating the variable output response of select unit 60 and of actuator 40. As mentioned above, the nominal operative lengths A and B of shift arm 168 and shift finger 160, both of which are fixed to shift rod 162, may be 48 mm and 24 mm, respectively. Thus, there is a constant or fixed ratio of 2:1 between the linear movements of shift link 86 and shift rail 188 during performance of the shifting function.

The lever arm radius R of M-link lever arm 145 is of fixed length, in this example 20 mm. The length V (in mm) of virtual lever arm 163 of the M-link 132 is defined as $$V=20 \sin(\alpha) \tag{1}$$

with angle α expressed in degrees.

The cumulative distance D (in mm) of shift link 86 movement from its neutral gear position is defined as $$D=20-20 \cos(\alpha) \tag{2}$$

with angle α expressed in degrees.

The cumulative distance $Y_{SR}$ (in mm) of shift rail 188 movement from its neutral gear position as defined as $$Y_{SR}=(20-20 \cos(\alpha))/2 \tag{3}$$

with angle α expressed in degrees.

Figure 31:
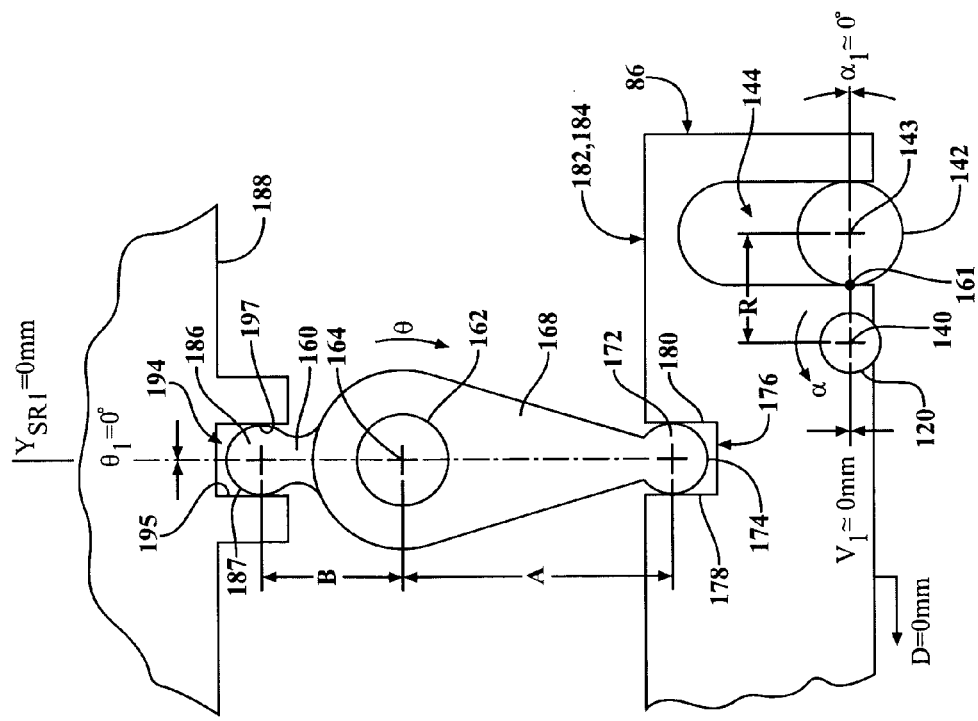
FIG. 31 is a partial, compound view of shift rail position relative to M-link position, in the neutral gear position at angle $\alpha_1$, in which the M-link has an first, initial virtual lever arm length $V_1$, according to an exemplary embodiment.

Referring to FIG. 31, the actuator shifting mechanism is shown in its neutral gear position, with the M-link angle magnitude $\alpha_1$ at or near zero degrees (e.g., at about 3° as shown), and virtual lever arm 163 length $V_1$ at or near zero (e.g., at about 1.05 mm as shown). Distance $Y_{SR1}$ of the linear movement of the shift rail 188 (and its control collar 234) from the neutral gear position is at or near zero (e.g., at about 0 mm as shown), i.e., the shift rail 188 (and its control collar 234) is centered in its neutral gear position.

Figure 32:
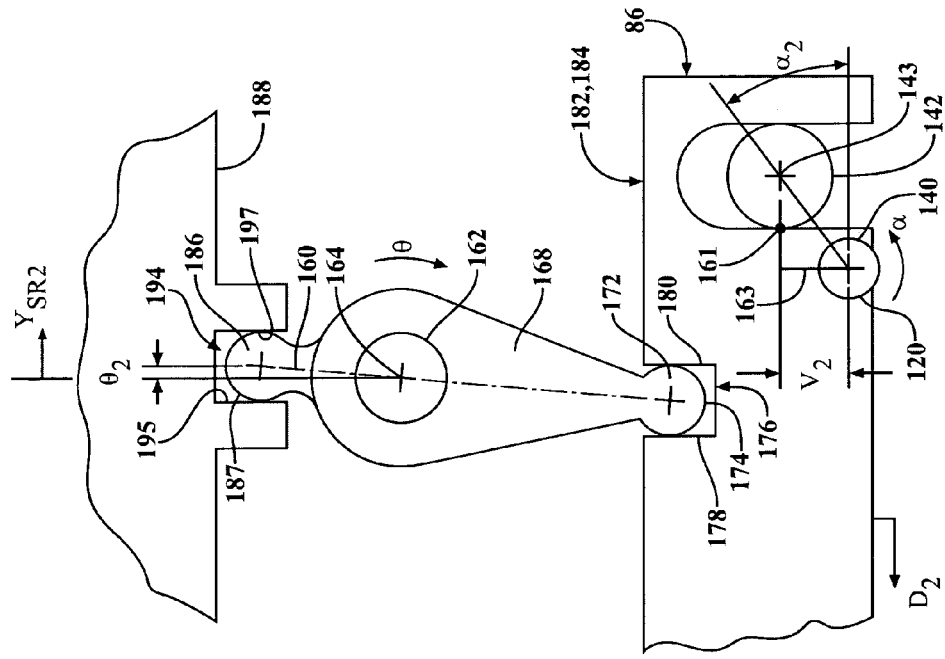
FIG. 32 is similar to the view of FIG. 31, but with the M-link rotated to angle $\alpha_2$ greater than $\alpha_1$ at which the M-link has a first virtual lever arm length $V_2$ greater than $V_1$.

Referring to FIG. 32, the actuator shifting mechanism is shown with M-link angle magnitude $\alpha_2$ (e.g., at about 37° as shown), and virtual lever arm 163 length at distance $V_2$ (e.g., at about 12 mm as shown). Distance $Y_{SR2}$ of the linear movement of the shift rail 188 (and its control collar 234) from the neutral gear position is at a position at which the control collar 234 starts synchronization with the mainshaft or input shaft gear with which it becomes engaged (e.g., at or near 2 mm as shown).

Figure 33:
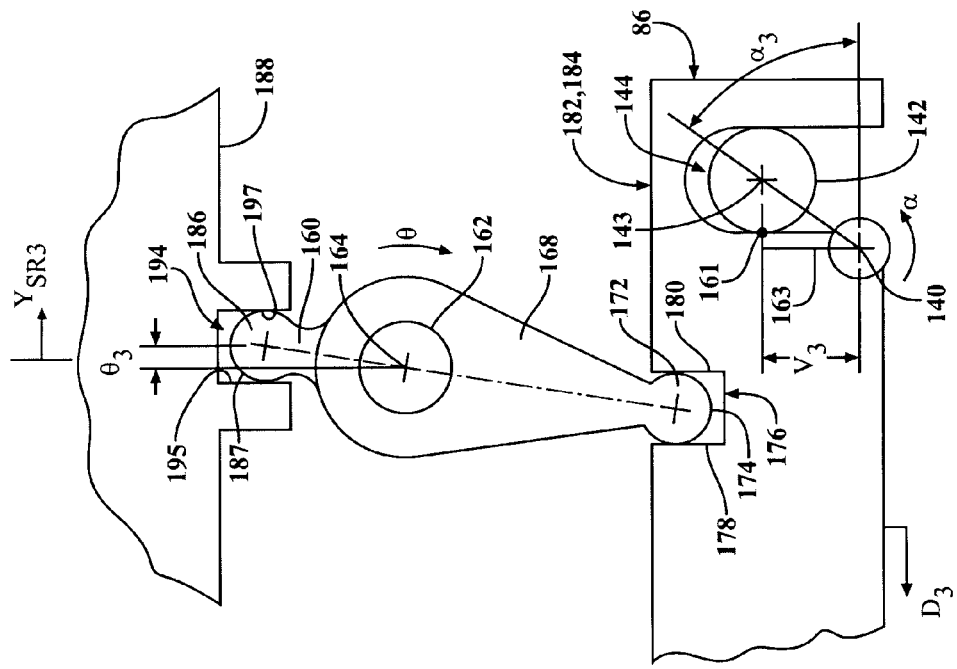
FIG. 33 is similar to the view of FIG. 32, but with the M-link rotated to angle $\alpha_3$ greater than $\alpha_2$ at which the M-link has a first virtual lever arm length $V_3$ greater than $V_2$.

Referring to FIG. 33, the actuator shifting mechanism is shown with M-link angle magnitude $\alpha_3$ (e.g., at about 53° as shown), and virtual lever arm 163 length at distance $V_3$ (e.g., at about 16 mm as shown). Distance $Y_{SR3}$ of the linear movement of the shift rail 188 (and its control collar 234) from the neutral gear position is at a position at which it finishes synchronization with the gear with which it engages (e.g., at or near 4 mm as shown).

Figure 34:
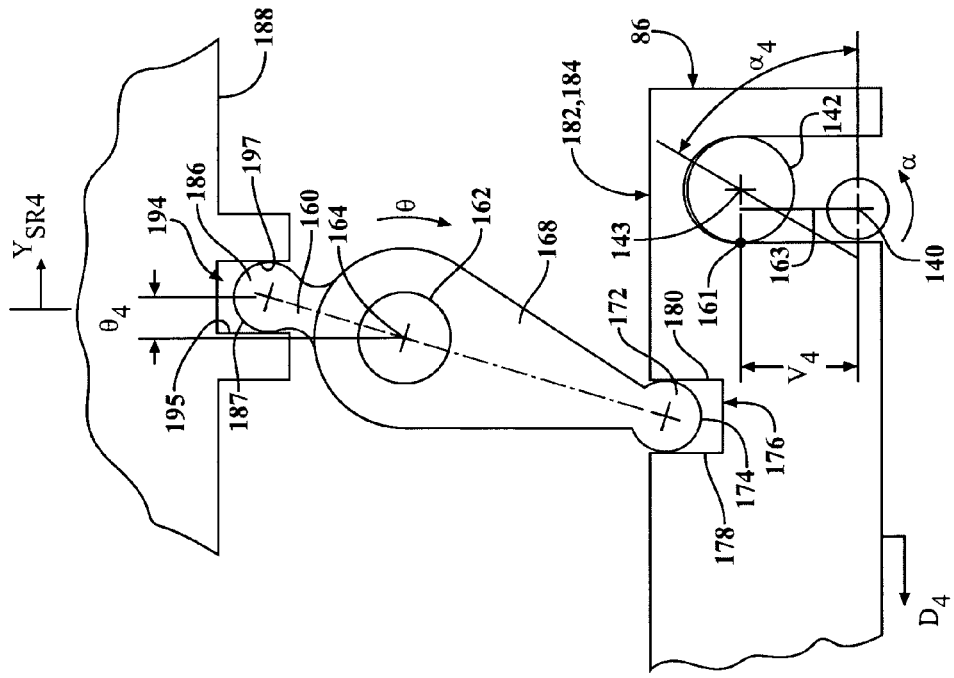
FIG. 34 is similar to the view of FIG. 33, but with the M-link rotated to angle $\alpha_4$ greater than $\alpha_3$ at which the M-link has a first virtual lever arm length $V_4$ greater than $V_3$.

Referring to FIG. 34, the actuator shifting mechanism is shown with M-link angle magnitude $\alpha_4$ (e.g., at about 79° as shown), and virtual lever arm 163 length at distance $V_4$ (e.g., at about 19.6 mm as shown). Distance $Y_{SR4}$ of the linear movement of the shift rail 188 (and its control collar 234) from the neutral gear position is at a position at which it is fully engaged with the respective gear (e.g., at or near 8 mm as shown). In this example, angle α may have a cumulative range of between about ±79°, with further movement beyond this range (e.g., to ±90°) further seating the control collar 234 and its engaged gear only minimally.

The progression from $\alpha_1$ to $\alpha_2$ to $\alpha_3$ to $\alpha_4$ variably increases the length V of virtual lever arm 163, which provides beneficial higher ratios, between the linear movements of shift link 86 and shift rail 188, during synchronization, when additional control collar engaging force is advantageous. Up to about 4 mm of control collar 234 travel from its neutral gear position typically requires that higher forces be applied to the shift rail 188 to match the control collar and the gear to which is becomes engaged.

Upon the finishing of synchronization, in other words, upon reaching about 4 mm of shift rail 188 and control collar 234 travel from their neutral gear positions (as shown in FIG. 33), further movement of the shift rail 188 and control collar 234 into the gear engagement position at about 8 mm of shift rail 188 and control collar 234 travel (as shown in FIG. 34) requires a relatively lower force. Thus, at higher magnitudes of angle α, lower V:R ratios, which represents the varying levels of gain between the input of motors 46, 48 and the output of shift collar 234, are acceptable.

Figure 35:
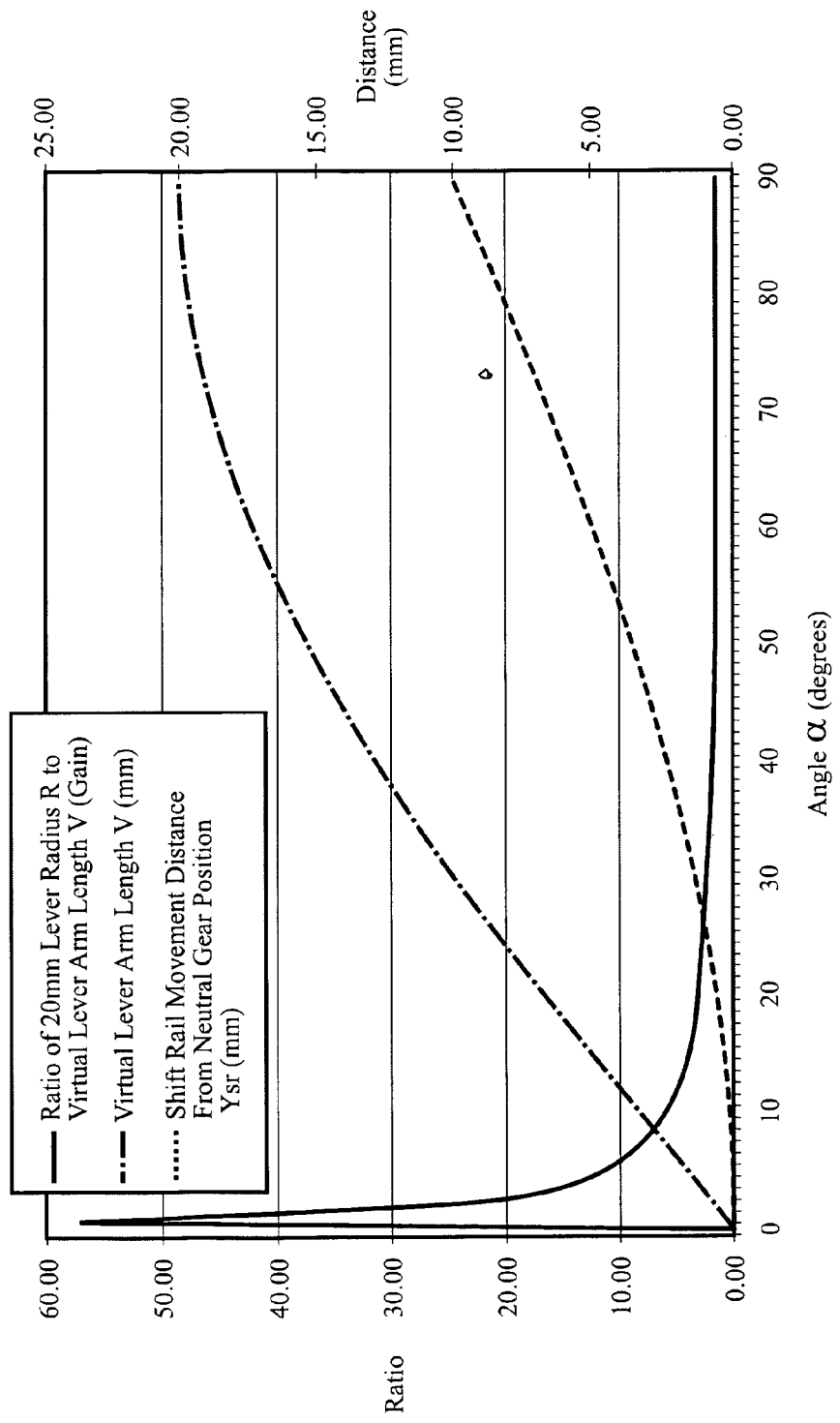
FIG. 35 is a chart illustrating an example of the actuator's variable output response with motor input rotation during performance of its shifter function.

The above-described variable and nonlinear output response of actuator 40 is illustrated by the three identified curves plotted in FIG. 35 relative to the above-described example.

It can thus be understood that actuator 40 operates both of its motors 46, 48 in concert through their simultaneous rotation to perform both of the two distinct functions of gate selection along the X-direction, and shifting between gears within the selected gate along the Y-direction. In other words, the pair of electric motors operate in concert with each other, combining their actuating forces, during the actuation of gear position changes, both within a gate (Y-direction movement) and between different gates (X-direction movement), rather than operating separately and independently from each other. Relative to prior shift-by-wire actuators, in which selection and shift operations are respectively performed through the sole operation of the respective one of their two motors, each motor being individually sized for its respectively designated task, the motors of actuator 40 may be identical and comparatively smaller, thereby reducing costs, and having reduced inertia, which can improve dynamic response of the actuator.

The invention has been described in an illustrative manner, and it is to be understood that the terminology which has been used is intended to be in the nature of words of description rather than of limitation. Obviously, many modification and variations of the present invention are possible in light of the above teachings. It is, therefore, to be understood that within the scope of the appended claims, wherein reference numerals are merely for convenience and are not to be in any way limiting, the invention may be practiced otherwise than as specifically described.

What is claimed is:

1. A gear change actuator (40) for use with a change-gear transmission (42), comprising:
    an output member (162, 168) having an output axis (164), said output member (162, 168) adapted for changing between different gear shifter positions in a transmission (42) through movement of said output member (162, 168) relative to said output axis (164);
    a select unit (60) operably engaged with said output member (162, 168), said select unit (60) having opposite first and second output movements and opposite third and fourth output movements, a respective one of a plurality of different movements of said output member (162, 168) relative to said output axis (164) being imparted to said output member (162, 168) by a respective one of said first, second, third and fourth output movements;
    a first motor (46, 48) having a drive axis (56) and comprising a first rotary member (54), said first rotary member (54) capable of rotation in opposite first and second directions about said first motor drive axis (56);
    a second motor (46, 48) having a drive axis (56) and comprising a second rotary member (54), said second rotary member (54) capable of rotation in opposite first and second directions about said second motor drive axis (56);
    said first and second rotary members (54) operably engaged with said select unit (60) and having simultaneous rotation of their respective drive axes during operation of said actuator (40);
    said select unit (60) having a first input motion induced by simultaneous rotation of said first and second rotary members (54) each in one of its respective first and second directions to facilitate said first output movement, and a second input motion, opposite said first input motion, induced by simultaneous rotation of said first and second rotary members (54) each in the other of its respective first and second directions to facilitate said second output movement; and
    said select unit (60) having a third input motion induced by simultaneous rotation of said first rotary member (54) in said other of its respective first and second directions and of said second rotary member (54) in said one of said respective first and second directions to facilitate said third output movement, and a fourth input motion induced by simultaneous rotation of said first rotary member (54) in said one of its respective first and second directions and of said second rotary member (54) in said other of its respective first and second directions to facilitate said fourth output movement;
    wherein movements of said output member respectively imparted by said first and second output movements of said select unit are one of rotationally about said output axis and axially along said output axis (164), and movements of said output member respectively imparted by said third and fourth output movements of said select unit are the other of rotationally about said output axis (164) and axially along said output axis;
    wherein said select unit (60) comprises an input member (120, 122) having a central axis (140), said input member (120, 122) being disposed between said first and second rotary members (54) and operably engaged therewith;
    wherein said first and second input motions of said select unit each comprise a rotation of said input member (120, 122) about said central axis (140);
    and wherein third and fourth input motions of said select unit each comprise movement of said input member (120, 122) in a lateral direction relative to said central axis (140).

2. The gear change actuator (40) of claim 1, wherein said first and second motor drive axes (56) are substantially parallel with each other and said input member central axis (140) is located centrally between and substantially normal to an imaginary plane containing said first and second motor drive axes (56), said select unit (60) third and fourth input motions being in directions parallel to said first and second motor drive axes (56).

3. The gear change actuator (40) of claim 1, wherein said first and second rotary members (54) each comprises a threaded portion (58) and said input member (120, 122) comprises a gear wheel (122), said gear wheel (122) having a periphery about which are provided gear teeth (124), said gear teeth (124) enmeshed with said first and second rotary member threaded portions (58), said select unit (60) first and second input motions induced by rotation of each of said first and second rotary members (54), said input member central axis (140) maintained in a substantially constant position along said first and second motor drive axes (56) during said select unit (60) first and second input motions.

4. The gear change actuator (40) of claim 1, wherein said first and second rotary members (54) each comprises a threaded portion (58) and said input member (120, 122) comprises a gear wheel (122), said gear wheel (122) having a periphery about which are provided gear teeth (124), said gear teeth (124) enmeshed with said first and second rotary member threaded portions (58), said select unit (60) third and fourth input motions induced by rotation of each of said first and second rotary members (54), said input member (120, 122) maintained in a substantially constant angular orientation about said central axis (140) during said select unit (60) third and fourth input motions.

5. The gear change actuator (40) of claim 1, wherein said output axis (164) is substantially parallel with an imaginary plane containing said first and second motor drive axes (56), said select unit (60) first and second output movements being in directions substantially perpendicular to said output axis (164), said select unit (60) third and fourth output movements being in directions substantially parallel with said output axis (164).

6. The gear change actuator (40) of claim 1, wherein said select unit (60) comprises a carrier (66) and a shift link (86) slidably engaged with said carrier (66), said select unit (60) first and second output movements including relative movement between said carrier (66) and said shift link (86), said select unit (60) third and fourth output movements including united movement of said carrier (66) and said shift link (86).

7. The gear change actuator (40) of claim 6, wherein said select unit (60) comprises said input member (120, 122) having said central axis (140), said input member (120, 122) supported by said carrier (66) and operably engaged with said first and second rotary members (54), the induced select unit (60) first, second, third, and fourth input motions imparted by said first and second rotary members (54) to said input member (120, 122), and wherein said select unit (60) third and fourth output movements include united movements of said shift link (86) and said carrier (66) in directions perpendicular to said central axis (140).

8. The gear change actuator (40) of claim 6, wherein select unit (60) first and second output movements are movements of said shift link (86) relative to said carrier (66) in directions perpendicular to said central axis (140).

9. The gear change actuator (40) of claim 8, wherein said output member (162, 168) comprises an elongate shift rod (162) that extends along said output axis (164) and a shift arm (168) fixed to said rod (162) and extending radially relative to said output axis (164), said output axis (164) fixed in position relative to said first and second motor axes (56), said shift arm (168) engaged with said shift link (86), said shift arm (168) moved by at least one of said carrier (66) and said shift link (86) during said select unit (60) first, second, third, and fourth output movements.

10. The gear change actuator (40) of claim 9, wherein said shift arm (168) is moved with said carrier (66) only during said select unit (60) third and fourth output movements.

11. The gear change actuator (40) of claim 10, wherein said carrier (66) is provided with an elongate slot (170) through which said shift arm (168) extends, said slot (170) located between said rod (162) and said shift link (86), movement of said shift arm (168) induced by abutting engagement with an edge of said slot (170) during at least one of said select unit (60) third and fourth output movements, said shift arm (168) having movement along said slot (170) during said select unit (60) first and second output movements.

12. The gear change actuator (40) of claim 11, wherein movement of said shift arm (168) is induced by its abutting engagement with an edge of said slot (170) during said select unit (60) third and fourth output movements.

13. The gear change actuator (40) of claim 7, wherein said carrier (66) has a guide surface (72, 78, 80, 82) with which said shift link (86) is slidably engaged, said shift link (86) having first and second positions along said guide surface (72, 78, 80, 82) that are spaced laterally relative to said central axis (140), said shift link (86) having a front surface (146) in which is a recess (144) defined by a pair of laterally spaced side walls (154, 156), said select unit (60) first and second output movements including at least portions of shift link (86) movements between said first and second positions, and said input member (120, 122) has opposite first and second directions of rotation about said central axis (140), said select unit (60) comprising a rotatable link member (132) comprising a base portion (134) rotatably fixed to said input member (120, 122), and a drive member (142) attached to said base portion (134) and radially spaced from said central axis (140), said drive member (142) in bearing engagement with at least one of said pair of laterally spaced recess side walls (154, 156) during at least a portion of the movement of said shift link (86) between its said first and second positions.

14. The gear change actuator (40) of claim 1,
wherein said select unit (60) further comprises:
a carrier (66) having a guide surface (72, 78, 80, 82), and a chamber (84) partially defined by said guide surface (72, 78, 80, 82), the select unit input member (120, 122) being supported by said carrier (66) and having an axis of rotation (140) corresponding to said central axis, said axis of rotation (140) extending into said chamber (84), said select unit input member (120, 122) having opposite first and second directions of rotation about said axis of rotation (140) corresponding to said select unit first and second input motions,
a shift link (86) disposed in said chamber (84) and supported by said guide surface (72, 78, 80, 82), said shift link (86) having first and second positions in said chamber (84) that are spaced laterally relative to said input member axis of rotation (140), said shift link (86) having a front surface (146) in which is a recess (144) defined by a pair of laterally spaced side walls (154, 156), and
a rotatable link member (132) comprising a base portion (134) rotatably fixed to said select unit input member (120, 122), and a drive member (142) attached to said base portion (134) and radially spaced from said select unit input member axis of rotation (140), said drive member (142) in bearing engagement with one of said pair of laterally spaced recess side walls (154, 156) during at least a portion of the movement of said shift link (86) between its said first and second positions, said shift link (86) urged by said drive member (142) towards said first position during rotation of said input member (120, 122) in said first direction of rotation, said shift link (86) urged by said drive member (142) towards said second position during rotation of said select unit input member (120, 122) in said second direction of rotation;
wherein the movements of said shift link (86) towards its said first and second positions each comprise at least a portion of the respective said select unit (60) first and second output movement.

15. The gear change actuator (40) of claim 14, wherein said shift link (86) has a pair of laterally spaced first and second said recesses (144) in said front surface (146), and said rotatable link member (132) comprises a pair of first and second said drive members (142), each said drive member (142) attached to said base portion (134) and radially spaced from said input member axis of rotation (140), said first drive member (142) disposed in said first recess (144) in said shift link (86) first position, said second drive member (142) disposed in said second recess (144) in said shift link (86) second position;

each said drive member (142) in bearing engagement with one of said pair of laterally spaced side walls (154, 156) defining a respective said recess (144) during at least a portion of the movement of said shift link (86) between said first and second positions, said shift link (86) urged by said first drive member (142) towards said first position during rotation of said input member (120, 122) in said first direction of rotation, said shift link (86) urged by said second drive member (142) towards said second position during rotation of said input member (120, 122) in said second direction of rotation.

16. The gear change actuator (40) of claim 15, wherein said shift link (86) is urged by said first drive member (142) towards said second position during rotation of said input member (120, 122) in said second direction of rotation.

17. The gear change actuator (40) of claim 15, wherein said shift link (86) is urged by said second drive member (142) towards said first position during rotation of said input member (120, 122) in said first direction of rotation.

18. The gear change actuator (40) of claim 1, wherein said select unit (60) further comprises: a carrier (66) having a guide surface (72, 78, 80, 82), and a chamber (84) partially defined by said guide surface (72, 78, 80, 82), said input member (120, 122) is supported by said carrier (66), said central axis (140) of said input member (120, 122) extending into said chamber (84), said input member (120, 122) having opposite first and second directions of rotation about said central axis (140), a shift link (86) disposed in said chamber (84) and supported by said guide surface (72, 78, 80, 82), said shift link (86) having first and second positions in said chamber (84) that are spaced laterally relative to said input member axis of rotation (140), said shift link (86) having a front surface (146) in which is a recess (144) defined by a pair of laterally spaced side walls (154, 156), and a rotatable link member (132) comprising a base portion (134) rotatably fixed to said input member (120, 122), and a drive member (142) attached to said base portion (134) and radially spaced from said input member axis of rotation (140), said drive member (142) in bearing engagement with one of said pair of laterally spaced recess side walls (154, 156) during at least a portion of the movement of said shift link (86) between its said first and second positions, said shift link (86) urged by said drive member (142) towards said first position during rotation of said input member (120, 122) in said first direction of rotation, said shift link (86) urged by said drive member (142) towards said second position during rotation of said input member (120, 122) in said second direction of rotation;

wherein the movements of said shift link (86) towards said first and second positions are imparted by the opposing linear output movements of said select unit (60).

19. The gear change actuator (40) of claim 18, wherein said shift link (86) has a pair of laterally spaced first and second said recesses (144) in said front surface (146), and said rotatable link member (132) comprises a pair of first and second said drive members (142), each said drive members (142) attached to said base portion (134) and radially spaced from said input member axis of rotation (140), said first drive member (142) disposed in said first recess (144) in said shift link (86) first position, said second drive member (142) disposed in said second recess (144) in said shift link (86) second position;

each said drive members (142) in bearing engagement with one of said pair of laterally spaced side walls (154, 156) defining a respective said recess (144) during at least a portion of the movement of said shift link (86) between said first and second positions, said shift link (86) urged by said first drive member (142) towards said first position during rotation of said input member (120, 122) in said first direction of rotation, said shift link (86) urged by said second drive member (142) towards said second position during rotation of said input member (120, 122) in said second direction of rotation.

\* \* \* \* \*